(12) United States Patent
Sayama

(10) Patent No.: US 8,157,320 B2
(45) Date of Patent: Apr. 17, 2012

(54) HEADREST AND VEHICLE SEAT PROVIDED WITH THE SAME

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 302 days.

(21) Appl. No.: 12/570,100

(22) Filed: Sep. 30, 2009

(65) Prior Publication Data

US 2010/0078972 A1 Apr. 1, 2010

(30) Foreign Application Priority Data

Sep. 30, 2008 (JP) ................................. 2008-253202

(51) Int. Cl.
*B60N 2/48* (2006.01)
(52) U.S. Cl. .......................................... 297/61; 297/408
(58) Field of Classification Search .................... 297/61, 297/216.12, 408
See application file for complete search history.

(56) References Cited

U.S. PATENT DOCUMENTS

| | | | | |
|---|---|---|---|---|
| 5,681,079 A | * | 10/1997 | Robinson | 297/61 |
| 5,895,094 A | * | 4/1999 | Mori et al. | 297/410 |
| 6,074,011 A | * | 6/2000 | Ptak et al. | 297/408 |
| 6,902,232 B2 | * | 6/2005 | Kamrath et al. | 297/61 |
| 7,118,171 B2 | * | 10/2006 | Fowler et al. | 297/61 |
| 7,140,687 B2 | * | 11/2006 | Hoekstra et al. | 297/410 |
| 7,201,437 B2 | * | 4/2007 | Freijy | 297/61 |
| 7,325,877 B2 | * | 2/2008 | Brockman et al. | 297/408 |
| 8,016,354 B2 | * | 9/2011 | Veluswamy et al. | 297/320 |
| 2006/0006720 A1 | * | 1/2006 | Yamada | 297/378.12 |
| 2007/0236069 A1 | * | 10/2007 | Chung | 297/408 |

FOREIGN PATENT DOCUMENTS

| | | |
|---|---|---|
| JP | 07-11951 U | 2/1995 |
| JP | 2005-349915 A | 12/2005 |

* cited by examiner

*Primary Examiner* — Peter R. Brown
(74) *Attorney, Agent, or Firm* — Drinker Biddle & Reath LLP

(57) ABSTRACT

There are provided a headrest that can be tilted from a head support state to a storage state by an operation at a position separate from the headrest, and an associated vehicle seat. The headrest includes a pillar mounted on the upper part of the seat back; a headrest frame turnably engaged with the pillar; a spring that urges the headrest frame to one side; a locking element or elements that hinder turning the headrest frame with respect to the pillar; a remote control section provided at a position separate from the headrest; and an inner cable one end part of which is connected to the locking element and the other end part of which is attached to the remote control section. The locking element or elements release by pulling the inner cable by the operation of the remote control section.

8 Claims, 19 Drawing Sheets

HEADREST AND VEHICLE SEAT PROVIDED WITH THE SAME

CROSS-REFERENCE TO RELATED PATENT APPLICATION

This application claims the benefit of Japanese Application No. 2008-253202, filed Sep. 30, 2008, the entire content of which is incorporated herein by reference.

BACKGROUND

The present invention relates to a headrest and a vehicle seat provided with the headrest. More particularly, it relates to a headrest that tilts from a head support state in which the headrest is raised with respect to a seat back to a storage state tilted from the head support state by remote control, and a vehicle seat provided with the headrest.

Generally, a headrest for protecting the passenger's head is mounted on the upper part of a seat back of a vehicle seat. Conventionally, there has been publicly known a configuration in which the lower part of a pillar of the headrest is attached to a transverse rod, which extends in the right and left direction in the seat back, so as to be rotatable in the front and rear direction, and the pillar is attached so as to be movable in the right and left direction, whereby the headrest is moved transversely and then is tilted to the rear to be stored (refer to Japanese Unexamined Utility Model Application Publication No. 7-11951).

The publicly known configuration described in Japanese Unexamined Utility Model Application Publication No. 7-11951 is a configuration in which the headrest is moved transversely and then is tilted to the rear to be stored. Therefore, to secure rear visibility, even when the headrest provided on a rear seat is stored, the passenger must operate the headrest directly by hand, which poses a problem of being difficult to use.

To solve such a problem, there has been proposed a technique in which the headrest, which is provided so as to be rotatable with respect to a pillar mounted on the upper part of the seat back, is provided with a tilting mechanism, which is configured so as to have a lock plate attached to the pillar side and a latch attached to the headrest main body side, whereby the headrest can be tilted to the rear by remote control by connecting the lock plate of the tilting mechanism to an electric actuator (refer to Japanese Unexamined Patent Application Publication No. 2005-349915).

The publicly known technique described in Japanese Unexamined Patent Application Publication No. 2005-349915 is configured so that the headrest tilting mechanism using the electric actuator can be accommodated entirely in the headrest main body, which offers high versatility and operability, and the headrest can be tilted from a head support state to a storage state by remote control. However, to comply with a request for a further decrease in cost, it has been desired to adopt a configuration in which no electric actuator is used.

SUMMARY

An object of the present invention is to provide a headrest that can be tilted from a head support state to a storage state by an operation at a position separate from the headrest without the passenger's direct operation of the headrest, and is easy to use and reduces the cost, and a vehicle seat provided with the headrest.

To achieve the above object, various embodiments of the present invention provide a headrest that tilts from a head support state in which the headrest is raised with respect to a seat back to a storage state, including a supporting member mounted on the upper part of the seat back; a headrest frame formed by combining a main frame and a sub frame which are rotatably engaged with the supporting member; a frame urging element or elements that urge the headrest frame to one side; a locking element or elements that hinder the rotating of the headrest frame with respect to the supporting member; a remote control provided at a position separate from the headrest; and an inner cable one end part of which is connected to the locking element or elements and the other end part of which is attached to the remote control, wherein the remote control pulls the other end part of the inner cable, and the locking element or elements release by the pulling operation of the inner cable due to at least the operation of the remote control.

According to the above-described configuration, since the remote control is provided at a position separate from the headrest, and the inner cable operable by the remote control is attached to the locking element or elements, the passenger need not operate the headrest directly, and can tilt the headrest by operating the remote control provided at a position separate from the headrest. Therefore, the passenger can secure the rear visibility by tilting the headrest from a position beyond his/her reach, so that the convenience in use is improved. Also, since the headrest can be tilted by the operation of the inner cable without the use of an electric actuator, a low cost can be achieved.

Also, in various embodiments of the present invention, it is preferable that the headrest has a control section directly operable by the passenger, which is different from the remote control, and the locking element or elements release by the direct operation of the control section.

Thus, the locking of the locking element or elements also release by the direct operation of the control section of the headrest apart from the pulling operation of the inner cable due to the operation of the remote control, and the headrest can be tilted. Therefore, when the passenger is present at a position close to the headrest, for example, when the seat is made in the storage state, the headrest tilts by operating the control section of the headrest directly, so that higher operability is achieved.

Specifically, it is preferable that the locking element or elements have an operation lever provided so as to be movable by the pulling operation of the inner cable, the operation lever have a locking part for locking one end part of the inner cable, and the one end part of the inner cable be locked to the locking part so that the operation lever pulls in one direction only.

By the above-described configuration, when the inner cable is pulled by the operation of the remote control, the operation lever is moved in the inner cable pulling direction, and when the operation lever is moved by operating the control section directly, one end part of the inner cable does not hinder the movement of the operation lever because one end part of the inner cable is not locked to allow pulling of the operation lever. Therefore, the operating elements for tilting the headrest can be used independently.

Further specifically, it is preferable that the remote control be disposed at the lower side of a dashboard on the driver's seat side.

According to the above-described configuration, the passenger can operate the remote control in a posture of being seated on the driver's seat to tilt the headrest of the rear seat and thereby to secure the rear visibility, so that this headrest is easy to use.

To achieve the above object, various embodiments of the present invention provide a vehicle seat provided with a headrest that tilts from a head support state in which the headrest is raised with respect to a seat back to a storage state, wherein the headrest includes a supporting member mounted on the upper part of the seat back; a headrest frame formed by combining a main frame and a sub frame which are rotatably engaged with the supporting member; a frame urging element or elements that urge the headrest frame to one side; a locking element or elements that hinder the rotating of the headrest frame with respect to the supporting member; a remote control provided at a position separate from the headrest; and an inner cable one end part of which is connected to the locking element or elements and the other end part of which is attached to the remote control, the remote control pulls the other end part of the inner cable, and the locking element or elements release by the pulling operation of the inner cable due to at least the operation of the remote control.

By the above-described configuration, the vehicle seat provided with the headrest having the above-described features can be obtained.

To solve the above object, various embodiments of the present invention also provide a vehicle seat provided with a headrest, including a seat back rotatable with respect to a seat cushion; and the headrest that tilts from a head support state in which the headrest is raised with respect to the seat back to a storage state, wherein the headrest includes a supporting member mounted on the upper part of the seat back; a headrest frame formed by combining a main frame and a sub frame which are rotatably engaged with the supporting member; a frame urging element or elements that urge the headrest frame to one side; a locking element or elements that hinder the rotating of the headrest frame with respect to the supporting member; an inner cable one end part of which is connected to the locking element or elements and the other end part of which is attached to the seat cushion; and an outer cable for guiding the inner cable, one end part of which is fixed to the headrest frame and the other end part of which is fixed to the seat back, the other end part of the inner cable is attached to a position separate in the direction opposite to the tilt direction at the time when the seat back is folded from the rotation center of the seat back with respect to the seat cushion, and is pulled in association with the folding operation of the seat back, and the locking element or elements release by the pulling operation of the inner cable due to at least the folding operation of the seat back.

To achieve the above object, various embodiments of the present invention further provide a vehicle seat provided with a headrest, including a seat back rotatable with respect to a bracket provided on the vehicle side; and the headrest that tilts from a head support state in which the headrest is raised with respect to the seat back to a storage state, wherein the headrest includes a supporting member mounted on the upper part of the seat back; a headrest frame formed by combining a main frame and a sub frame which are rotatably engaged with the supporting member; a frame urging element or elements that urge the headrest frame to one side; a locking element or elements that hinder the rotating of the headrest frame with respect to the supporting member; an inner cable one end part of which is connected to the locking element or elements and the other end part of which is attached to the bracket; and an outer cable for guiding the inner cable, one end part of which is fixed to the headrest frame and the other end part of which is fixed to the seat back, the other end part of the inner cable is attached to a position separate in the direction opposite to the tilt direction at the time when the seat back is folded from the rotation center of the seat back with respect to the seat cushion, and is pulled in association with the folding operation of the seat back, and the locking element or elements release by the pulling operation of the inner cable due to at least the folding operation of the seat back.

According to the above-described configuration, one end part of the inner cable is connected to the locking element or elements, the other end part thereof is attached to a position separate in the direction opposite to the tilt direction at the time when the seat back is folded from the rotation center of the seat back provided on the seat cushion side or on the bracket, and the configuration is made such that the other end part of the inner cable is pulled in association with the folding operation of the seat back. Therefore, the headrest can be prevented from tilting with the folding of the seat back and coming into contact with the front seat and the like. Also, the number of operations performed by the passenger can be reduced, so that the convenience in use is improved. Also, since the headrest tilts by the operation of the cable without the use of an electric actuator, the cost can be reduced.

In the above-described configurations, it is preferable that the vehicle seat be stored as a rotary storage type, a fall-down type, or a double fall-down type.

Thus, by applying the above-described configuration to the storable vehicle seat, when the vehicle seat is stored, the headrest is tilted automatically in association with the folding of the seat back. Therefore, the number of operations can be reduced, and the operation for storing the seat can be made easy, so that the convenience in use is improved.

Furthermore, it is preferable that the headrest has a control section operable directly by the passenger, which is different from the folding operation of the seat back, and the locking element or elements release by the direct operation of the control section.

By the above-described configuration, the headrest can also be tilted by the direct operation of the control section of the headrest apart from the pulling operation of the inner cable due to the folding operation of the seat back. Therefore, when the passenger is present at a position close to the headrest, the headrest tilts by operating the control section, so that higher operability can be achieved.

Accordingly, by providing the remote control at a position separate from the headrest, the headrest of the rear seat tilts to secure the rear visibility by remote control from a position where the passenger cannot reach the headrest, particularly in the state in which the passenger is seated on the driver's seat. Therefore, a headrest that is easy to use and a vehicle seat provided with this headrest can be provided.

Also, the headrest can be tilted by the operation of the inner cable without the use of an electric actuator. Therefore, a headrest that can reduce the cost and a vehicle seat provided with this headrest can be provided.

Furthermore, the headrest can be tilted by either one of the pulling operation of the inner cable due to the operation of the remote control and the direct operation of the control section of the headrest. Therefore, a headrest having higher operability and a vehicle seat provided with this headrest can be provided.

Also, in the case where the control section is operated directly, one end part of the inner cable does not hinder the operation of the operation lever of the locking element or elements. Therefore, a headrest in which the operating elements for tilting the headrest can be used independently and a vehicle seat provided with this headrest can be provided.

According to various embodiments of the present invention, the headrest tilts automatically with the folding of the seat back, the headrest can be prevented from coming into contact with another vehicle seat arranged in the front, and the number of operations performed by the passenger can be reduced. Therefore, a headrest that is easy to use and a vehicle seat provided with this headrest can be provided.

Also, by applying the configuration in accordance with various embodiments of the present invention to the storable vehicle seat, the seat storing operation is made easy. Therefore, a storable vehicle seat that is easier to use can be provided.

BRIEF DESCRIPTION OF THE DRAWINGS

The invention is described below with reference to various embodiments illustrated in the drawings.

DETAILED DESCRIPTION OF THE PREFERRED EMBODIMENTS

First Embodiment

A first embodiment of the present invention will now be described with reference to the accompanying drawings. The members, arrangements, and the like explained below do not restrict the present invention, and, needless to say, can be changed variously without departing from the spirit and scope of the present invention.

Figure 1:
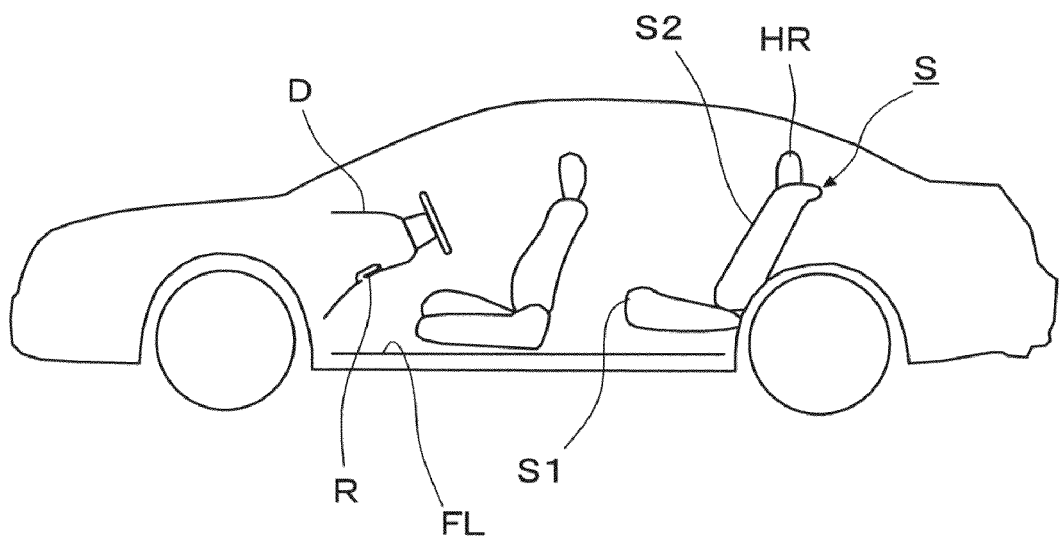
FIG. 1 is a schematic side view of a vehicle provided with a seat back in accordance with a first embodiment of the present invention.

As shown in FIG. 1, a vehicle seat S of this embodiment is an example of a rear seat of an automobile seat provided on a vehicle V. The vehicle seat S includes a seat cushion S1 and a seat back S2, and on the upper part of the seat back S2, a headrest HR is provided. The seat cushion S1 and the seat back S2 have a publicly known configuration in which a frame, a pad, and a seat cover material for covering the frame and pad are provided, and therefore the details thereof are omitted. Also, a remote control section R for tilting the headrest HR to the front is provided at the lower side of a dashboard D. The remote control section R is connected to the headrest HR via the cable module. The remote control section R corresponds to a remote control in this embodiment.

In this embodiment, explanation is given by taking the rear seat of the automobile seat as an example. However, the present invention can be applied to a front seat or an intermediate seat of vehicle as far as the seat can be mounted with the headrest.

First, the configuration of the headrest HR is explained below.

The headrest HR of this embodiment can be mounted on the seat back S2 via a pillar 1 serving as a supporting member so that the height thereof can be adjusted. To adjust the height of the headrest HR, a publicly known height adjusting mechanism can be used, and therefore the details of the mechanism are omitted. Also, in FIGS. 2 to 14, the cable module is omitted to prevent the complicatedness of the drawings.

Figure 2:
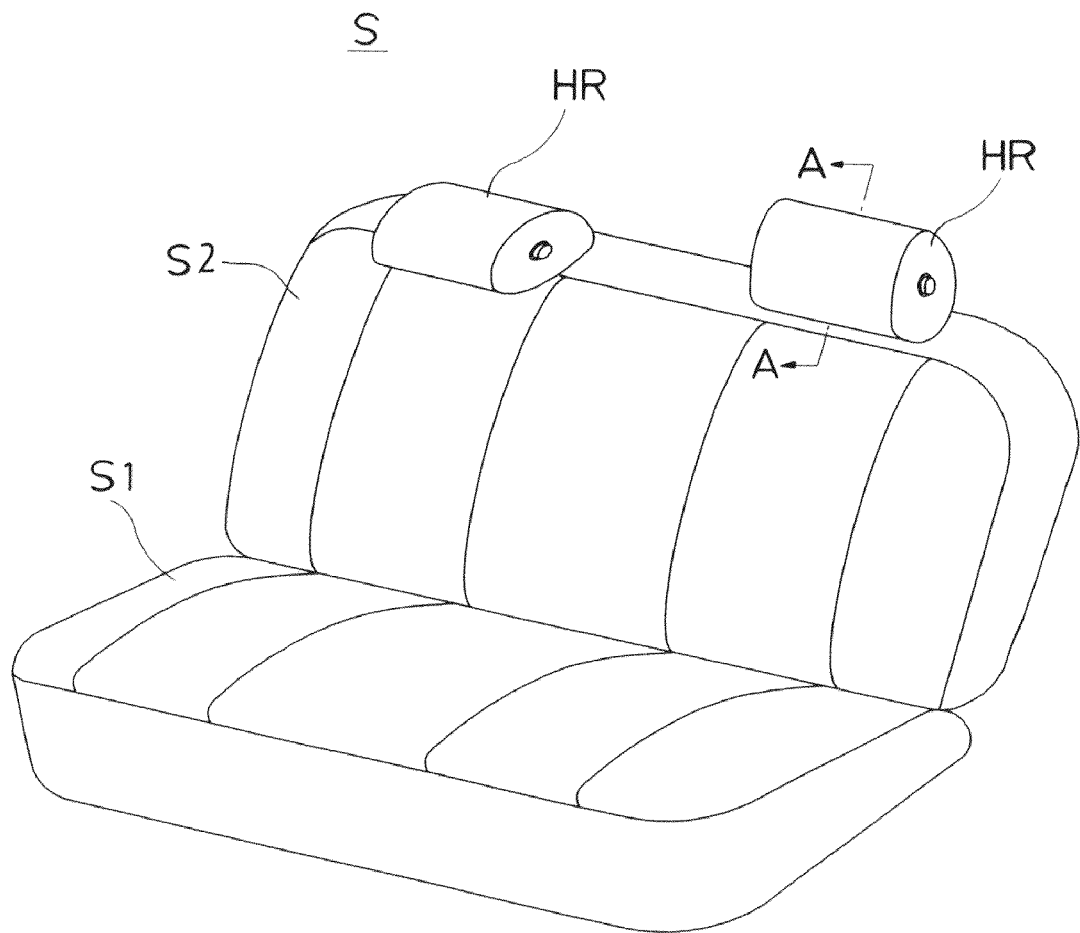
FIG. 2 is a perspective view of a seat provided with a seat back and a headrest in accordance with a first embodiment of the present invention.

As shown in FIG. 2, the headrest HR of this embodiment can become in a head support state in which the headrest HR is raised with respect to the seat back S2 and in a storage state tilted from the head support state (in the example shown in FIG. 2, the left-hand side in the figure shows the storage state).

The headrest HR includes, as principal components, the pillar 1 serving as the supporting member, a headrest frame 2 serving as a frame, a headrest frame urging element or elements 3 serving as a frame urging element or elements, and a locking element or elements 4.

Figure 4:
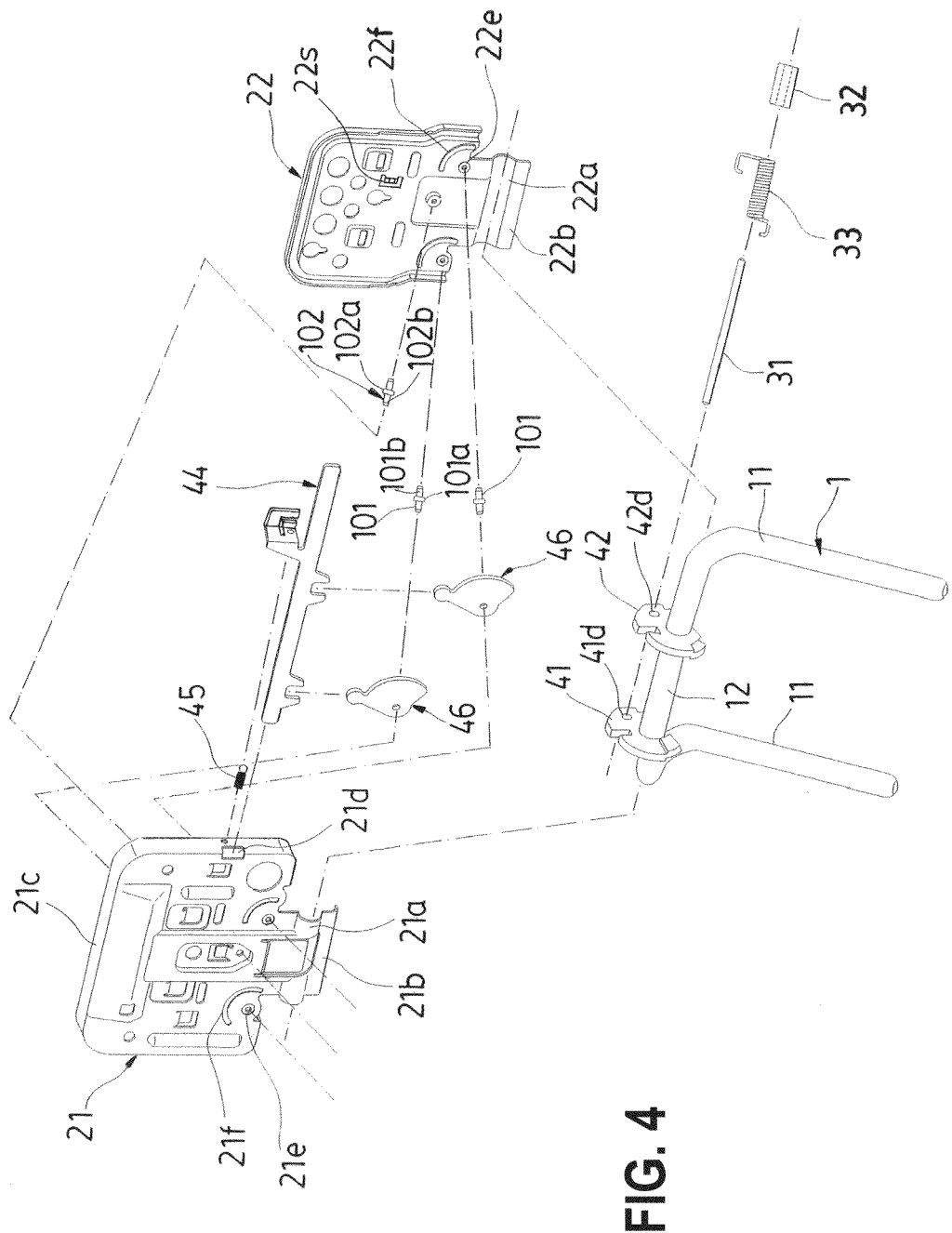
FIG. 4 is an exploded perspective view of a headrest frame and a locking element or elements in accordance with a first embodiment of the present invention.
Figure 5:
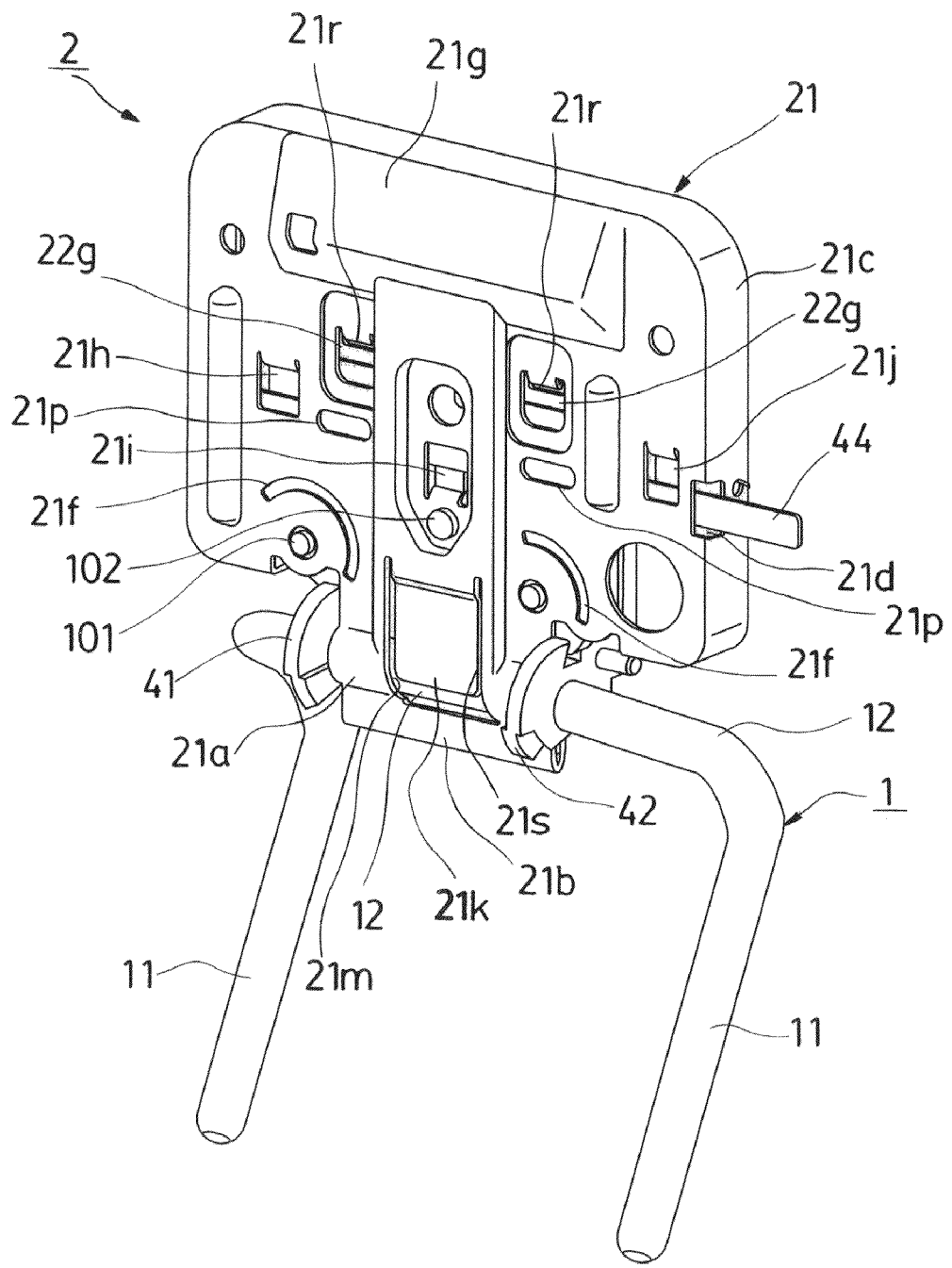
FIG. 5 is a perspective view of a headrest frame to which a pillar is assembled and a locking element or elements in accordance with a first embodiment of the present invention, viewed from the side on which the headrest frame comes into contact with the passenger's head.
Figure 10:
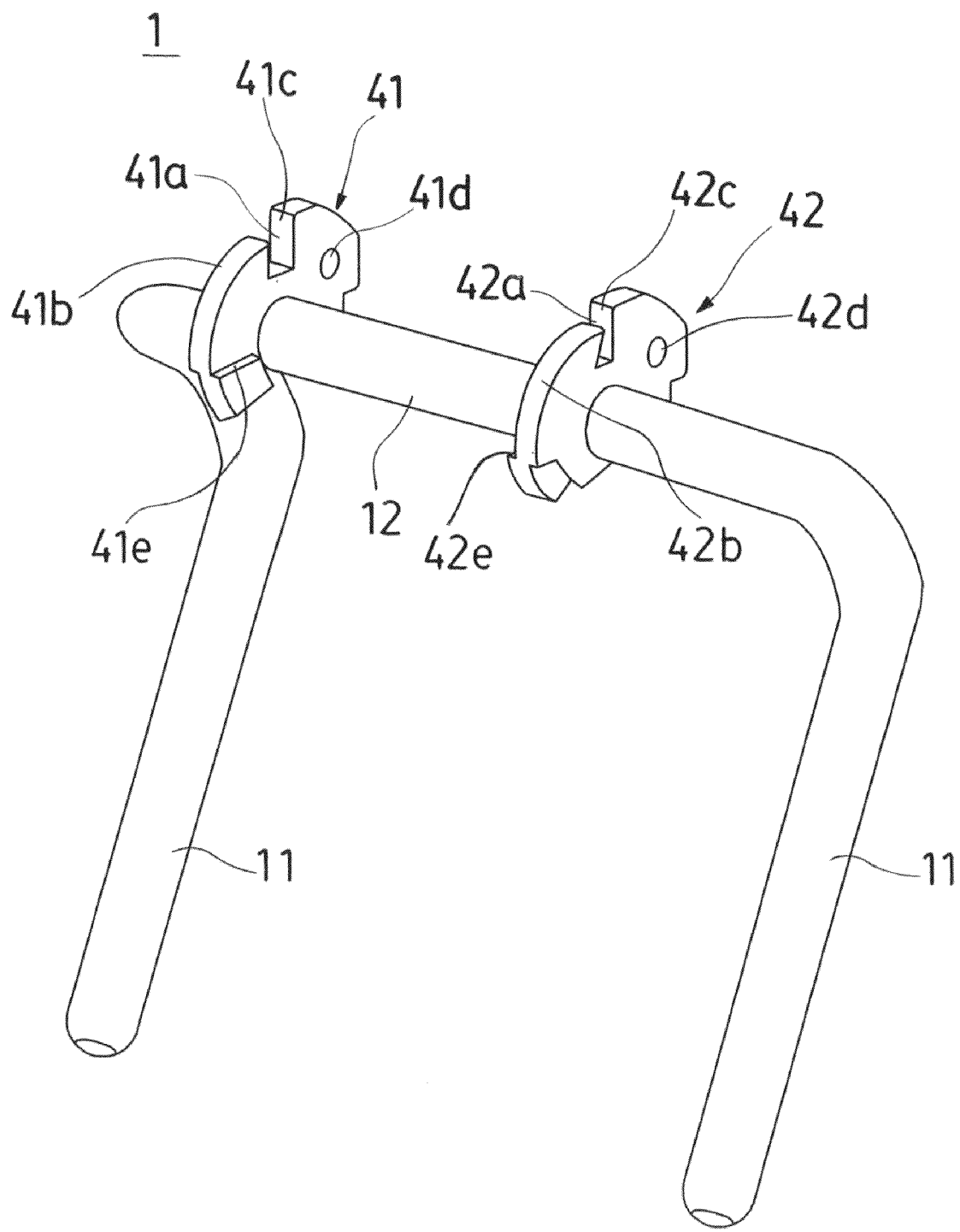
FIG. 10 is a perspective view of a pillar in accordance with a first embodiment of the present invention.

As shown in FIGS. 4 and 10, the pillar 1 serving as the supporting member of this embodiment has two leg parts 11 mounted on the upper part of the seat back S2, and a transverse shaft part 12 for connecting the two leg parts 11 to each other. To the transverse shaft part 12 of the pillar 1, latch plates 41 and 42 serving as locking members are fixed perpendicularly to the axis of the transverse shaft part 12 at a predetermined interval by welding or the like. A portion between the latch plates 41 and 42 of the transverse shaft part 12 is rotatably held by substantially semicircular lower assembling concave parts 21a and 22a formed in the lower part of the headrest frame 2 (a main frame 21 and a sub frame 22) serving as the frame, described below.

The latch plates 41 and 42 of this embodiment constitute the locking elements 4, described below.

The headrest frame 2 serving as the frame of this embodiment is rotatably engaged with the transverse shaft part 12 of the pillar 1 as described above, and as shown in FIGS. 4 and 7, is configured by being combined by a plurality of hemming staking parts 21r and blanked drawn parts 22g each having a hole 22h and hemming staking parts 21b and 22b, described below, so that the sub frame 22 enters the main frame 21.

In the headrest frame 2 comprising the main frame 21 and the sub frame 22, a ratchet lever 44 serving as an operation lever and ratchets 46 serving as fixing members are held. The main frame 21 and the sub frame 22 are assembled integrally to each other by staking from both front and rear sides with rivets 101 and 102 being held between them. The central parts 101a and 102a of the rivets 101 and 102 have a large diameter, and on both sides of the central parts 101a and 102a, staking parts 101b and 102b are formed. The ratchet lever 44 and the ratchets 46 of this embodiment constitute the locking elements 4, described below.

Figure 6:
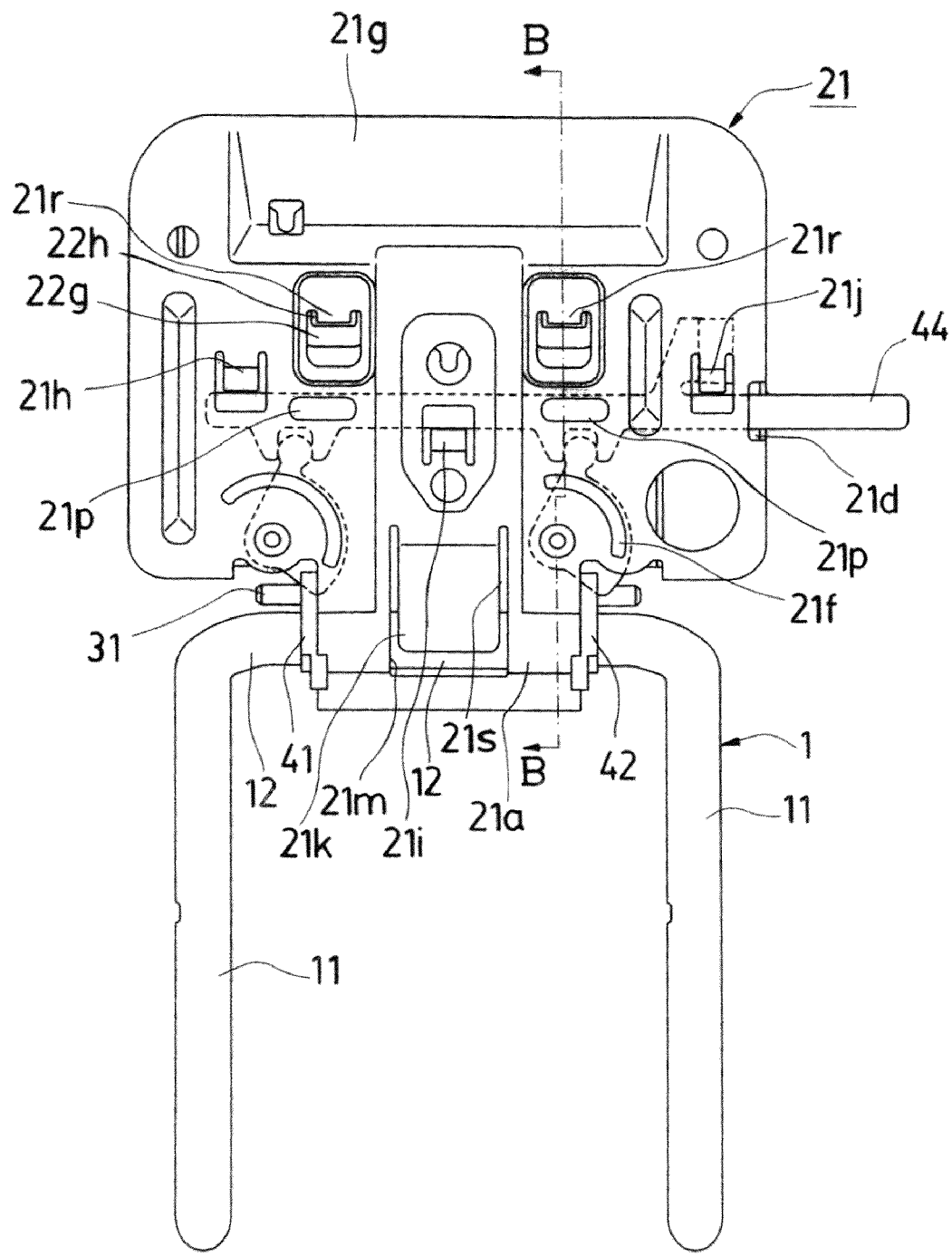
FIG. 6 is a front view of FIG. 5 in accordance with a first embodiment of the present invention.

As shown in FIGS. 4 and 6, the main frame 21 of this embodiment comprises a rectangular plate body. In the lower part thereof, the substantially semicircular lower assembling concave part 21a is formed, and the hemming staking part 21b is formed so as to be continuous with the lower assembling concave part 21a. The lower assembling concave part 21a is formed with a cut-away part 21m formed by cutting the middle part, and a looseness preventing piece 21k is formed so as to be directed to the cut-away part 21m. On both sides of the looseness preventing piece 21k, slits 21s are formed. This looseness preventing piece 21k has a spring effect due to the slits 21s, and is in contact with the transverse shaft part 12 of the pillar 1 so as to be pressed against the transverse shaft part 12. Thereby, the looseness between headrest 2 and the pillar 1 can be prevented with more certainty.

On the upper side of the main frame 21, a jutting-out part 21g is formed. This jutting-out part 21g is in contact with a projecting portion of a resin-made front cover member 7a, described below, and also secures the strength.

Also, at the outer periphery of the main frame 21, a bent wall part 21c is formed excluding predetermined ranges on both sides of the lower assembling concave part 21a.

On the inside of the main frame 21, boss parts 21e are formed in portions, through which the rivets 101 serving as the rotation shafts for the ratchets 46 are inserted, so as to project toward the inside. Also, on the outer periphery side of the boss part 21e, a substantially arc-shaped protruding part 21f is formed so as to project toward the rotating surface of the ratchet 46. This substantially arc-shaped protruding part 21f, together with a substantially arc-shaped protruding part 22f formed on the sub frame, described below, guides the ratchet 46 so that the ratchet 46 can be turned without play by being held between the protruding parts 21f and 22f.

On one side face of the bent wall part 21c, a cut-away part 21d is formed. The ratchet lever 44 is inserted through this cut-away part 21d. Also, on the extension of the cut-away part 21d, three tongue pieces 21h, 21i and 21j that are bent toward the inside are formed so as to serve as guides at the time when the ratchet lever 44 is inserted through.

The two tongue pieces 21h and 21j of the three tongue pieces 21h, 21i and 21j are bent toward the inside from the upside to the downside, and are formed at an interval in the right and left direction. In a substantially central portion of the tongue pieces 21h and 21j arranged in the right and left direction, one tongue piece 21i that is bent toward the inside from the downside to the upside is formed. The ratchet lever 44 is inserted through by using the three tongue pieces 21h, 21i and 21j as the guides. The ratchet lever 44 of this embodiment constitutes the locking element or elements 4, described below.

Furthermore, in the state in which the ratchet lever 44 is inserted through, at the position of the ratchet lever 44 of the main frame 21, embossed parts 21p directed to the ratchet lever 44 side are formed. This embossed parts 21p, together with embossed parts 22p formed on the sub frame 22, described below, guide the ratchet lever 44 so that the ratchet lever 44 can be moved without play by being held between the embossed parts 21p and 22p.

Figure 7:
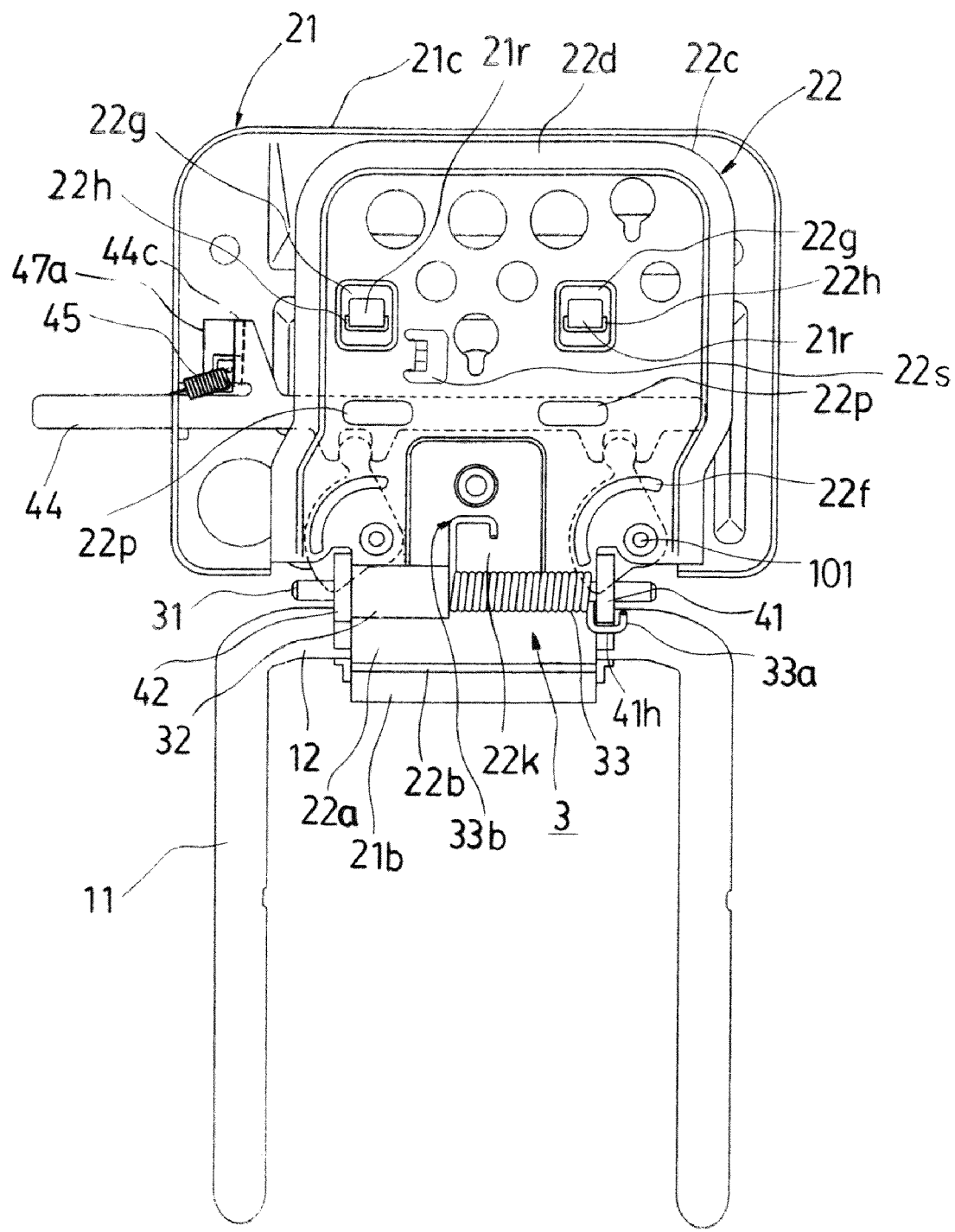
FIG. 7 is a rear view of FIG. 5 in accordance with a first embodiment of the present invention.
Figure 8:
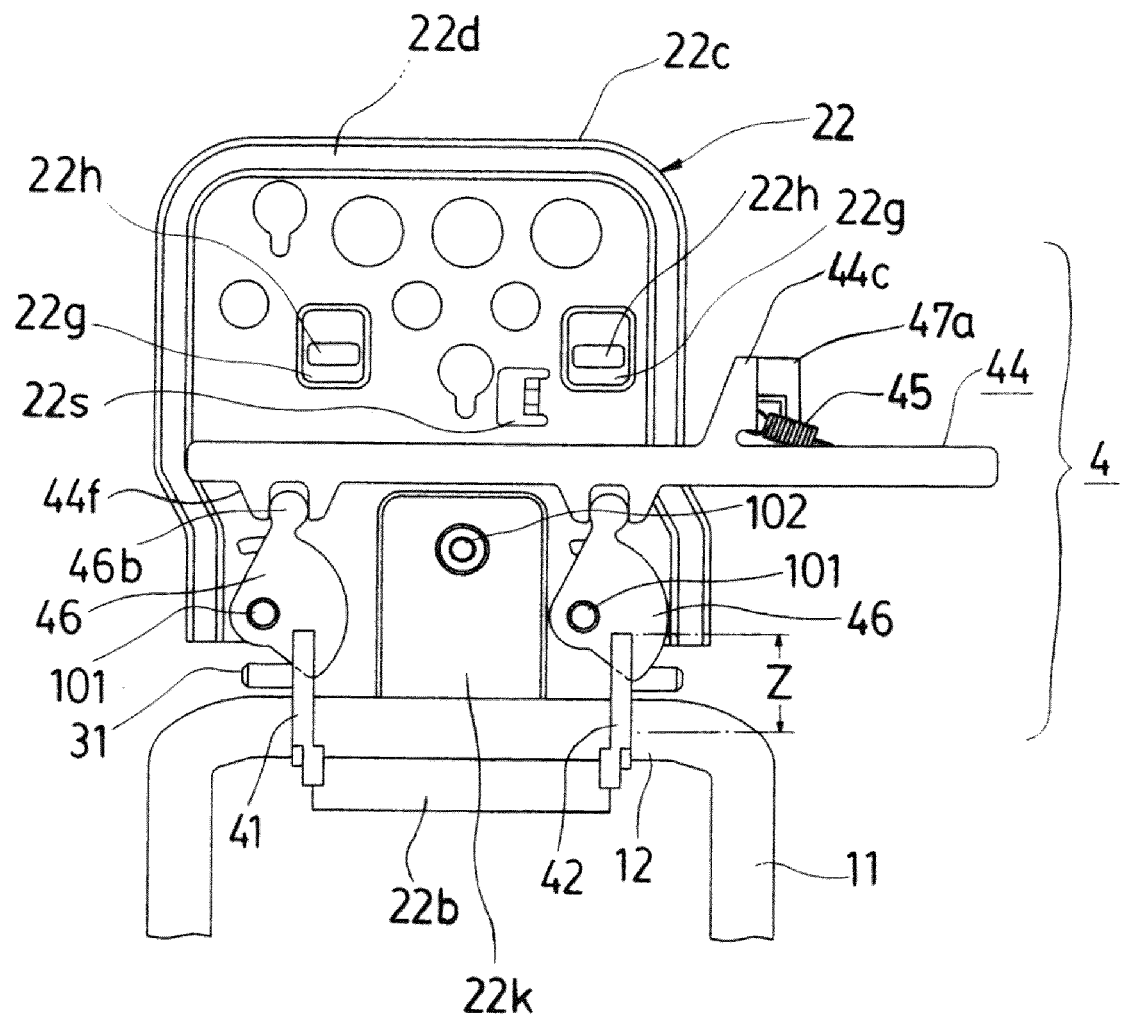
FIG. 8 is a pictorial illustrative view of a locking element or elements in accordance with a first embodiment of the present invention.
Figure 9:
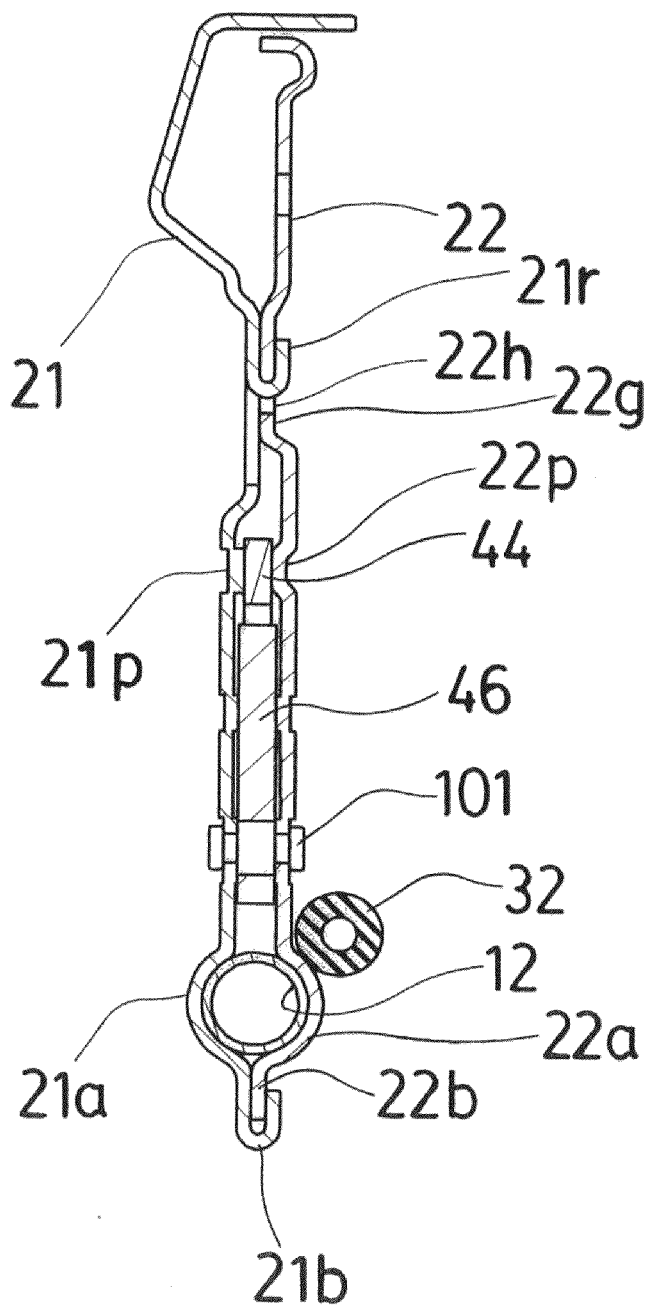
FIG. 9 is a sectional view taken along the line B-B of FIG. 6 in accordance with a first embodiment of the present invention.

As shown in FIGS. 4, 7 and 8, the sub frame 22 of this embodiment comprises a rectangular plate body, and is configured so that the upper part of a predetermined position, that is, the arrangement position of the above-described ratchet lever 44 in this embodiment, is offset to one side (toward the direction distant from the cut-away part 21d).

Also, as shown in FIGS. 7 and 8, a bent part 22c is formed in the upper part and at the right and left, excluding the lower side, of the sub frame 22. The inside of the bent part 22c is formed as an expanding part 22d expanding from the normal surface. This expanding part 22d, together with an urge receiving part 22k, described below, makes the normal surface (on the front side of paper of FIG. 7) low. Therefore, the rivets 101 and 102 and the hemming staking parts 21r are at positions lower than the expanding part 22d and the urge receiving part 22k, so that interference with other members can be prevented.

As shown in FIG. 8, at positions separating through a predetermined distance from the centerline of the sub frame 22, the blanked drawn parts 22g that project to the opposed main frame 21 side and have the hole 22h for hemming staking are formed.

In the lower part of the sub frame 22, the substantially semicircular lower assembling concave part 22a is formed, and the hemming staking part 22b is formed so as to be continuous with the lower assembling concave part 22a.

As described above, the main frame 21 and the sub frame 22 are staked in the same direction from the main frame 21 side to the sub frame 22 side by the hemming staking parts 21r and the blanked drawn parts 22g each having the hole 22h and the hemming staking parts 21b and 22b. Therefore, the working is easy as compared with the case of burring. The main frame 21 side is configured so that the staking claw and the like are not exposed, and the headrest frame side on the side of coming into contact with the passenger's head is configured so that protrusions and the like are absent as far as possible.

Also, on the opposite side to the hemming staking part 22b, the urge receiving part 22k is formed by drawing so as to be continuous with the lower assembling concave part 22a. As shown in FIG. 7, this urge receiving part 22k is configured so as to be in contact with the other end 33b of a spring 33, and is formed so as to be raised on the spring arrangement side. Also, the urge receiving part 22k is in contact with the spring 33 constituting the headrest frame urging element or elements 3 and also comes into contact with a damper 32, described below, at the rotating time, thereby preventing looseness and noise.

The bent part 22c (refer to FIG. 8) that is bent to the inside is formed in the upper part and at the right and left excluding the side on which the substantially semicircular lower assembling concave part 22a is provided.

On the sub frame 22, boss parts 22e projecting toward the inside are formed at positions matching the boss parts 21e of the main frame 21, that is, in portions through which the rivets 101 serving as the rotation shafts for the ratchets 46 are inserted. At positions of the ratchet lever 44 of the sub frame 22, the embossed parts 22*p* directed to the ratchet lever 44 side are formed.

Also, on the inside of the sub frame 22, the substantially arc-shaped protruding parts 22*f* projecting toward the turning surface of the ratchet 46 are formed so as to match the substantially arc-shaped protruding parts 21*f* formed on the main frame 21.

As shown in FIGS. 4 and 7, the headrest frame urging element or elements 3 serving as the frame urging element or elements is configured so as to urge the headrest frame 2 to one side (that is, the tilt side), and includes a shaft 31, the damper 32, the spring 33, shaft insertion holes 41*d* and 42*d* formed in the latch plates 41 and 42 constituting the locking element or elements 4, and the above-described urge receiving part 22*k*.

The shaft 31 is a round bar, and the damper 32 is formed by a hollow cylindrical body made of rubber. The spring 33 is disposed so that one end 33*a* thereof is locked to the latch plate 41, and the other end 33*b* side is in contact with the damper 32. Also, the other end 33*b* is made a wide pressing part, and is brought into contact with the above-described urge receiving part 22*k*. By urging, the headrest frame 2 is always subject to an urging force toward the tilt direction.

In assembling, the shaft 31 is inserted between the two latch plates 41 and 42. The shaft 31 is inserted through the shaft insertion hole 41*d* (or 42*d*) in one latch plate 41 (or 42), and then the damper 32 and the spring 33 are placed on the shaft 31. Next, the shaft 31 is inserted through the shaft insertion hole 42*d* (or 41*d*) in the other latch plate 42 (or 41).

Symbol 4 shown in FIG. 8 denotes the locking elements, which are provided between the pillar 1 and the headrest frame 2.

The locking elements 4 of this embodiment includes, as principal components, the latch plates 41 and 42 serving as the locking members, the ratchet lever 44 serving as the operation lever, the ratchets 46 serving as the fixing members, and a spring 45 serving as a ratchet lever urging element (operation lever urging element).

As described above, the latch plates 41 and 42 of this embodiment are fixed to the transverse shaft part 12 of the pillar 1 perpendicularly to the axis of the transverse shaft part 12 at a predetermined interval by welding or the like.

As shown in FIG. 10, in the upper parts of the latch plates 41 and 42, engagement groove parts 41*a* and 42*a* are formed along the transverse shaft part 12.

On the latch plates 41 and 42, arcuate outer peripheral parts 41*b* and 42*b* and stopper parts 41*c* and 42*c* configured by walls of portions of the engagement groove parts 41*a* and 42*a* are formed.

In this embodiment, the latch plates 41 and 42 are formed so that the engagement groove parts 41*a* and 42*a* have a different shape. The engagement groove part 42*a* of the latch plate 42 provided on the right-hand side in FIG. 10 is formed so that the upper end side thereof is narrower. On the other hand, the engagement groove part 41*a* of the latch plate 41 provided on the left-hand side in FIG. 10 is formed into a shape such that the groove width is equal in the up and down direction. On the end part side (the lower side in FIG. 10) on the side on which the headrest frame 2 of the latch plates 41 and 42 tilts, stopper parts 41*e* and 42*e* are formed.

Figure 12:
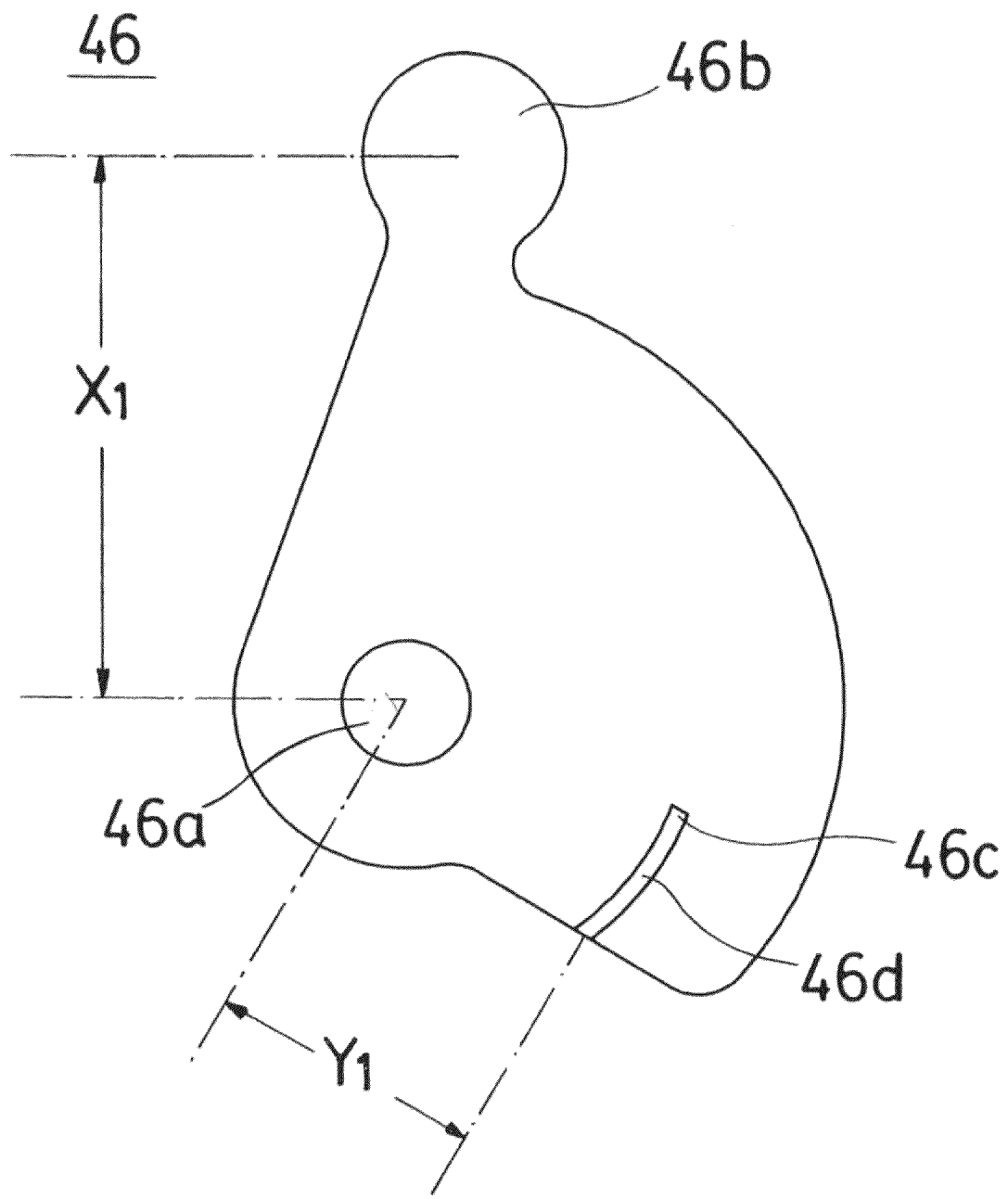
FIG. 12 is a plan view of a ratchet in accordance with a first embodiment of the present invention.
Figure 13:
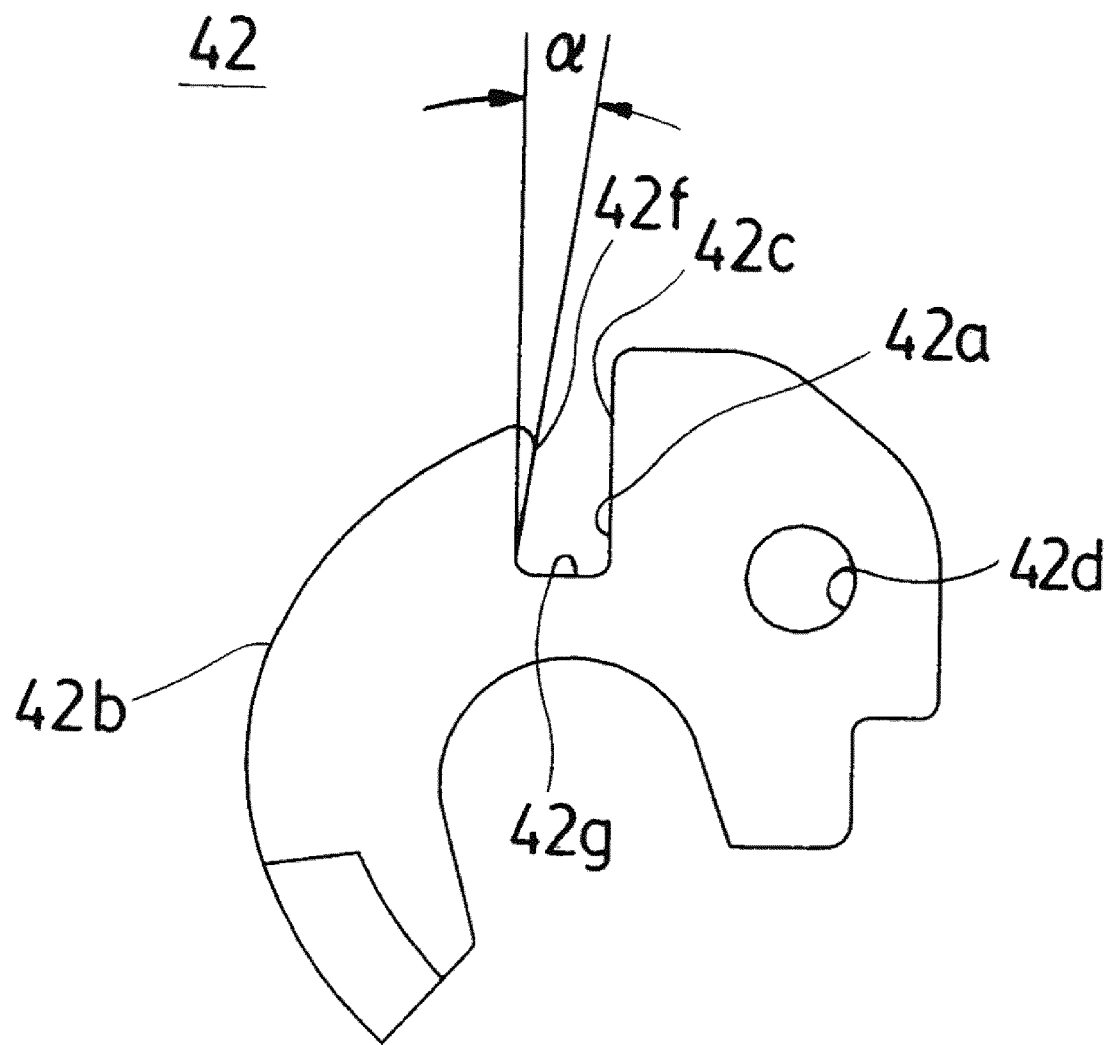
FIG. 13 is a side view of a latch plate in accordance with a first embodiment of the present invention.

FIG. 13 is a side view of the latch plate 42. The upper side of the engagement groove part 42*a* of the latch plate 42 tilts to the inside with a portion that is slightly wider than the thickness of the ratchet 46 being left (angle α in FIG. 13). Thus, in this embodiment, the engagement groove part 42*a* of at least one latch plate (in this embodiment, the latch plate 42) is formed so that the upper end side thereof is narrower. Therefore, the contact points between the latch plate 42 and the ratchet 46 in an raised state are an upper end part 42*f* of the engagement groove part 42*a* of the latch plate 42 and a lock engagement point 46*c* of the ratchet 46 shown in FIG. 12.

The lock engagement point 46*c*, which is the contact point, is at a side position at the time when the ratchet 46 comes into contact with a groove bottom 42*g* of the engagement groove part 42*a* of the latch plate 42.

Symbol 46*d* shown in FIG. 12 denotes a locus along which the ratchet 46 is moved from a disengagement position deviating from the engagement groove part 42*a* to a position at which the ratchet 46 comes into contact with the groove bottom 42*g* of the engagement groove part 42*a* of the latch plate 42.

That is to say, as shown in FIG. 8, the configuration is made such that the portion that comes into contact with the ratchet 46 on the upper end side formed so as to be narrow of the latch plate 42 has a larger distance Z from the transverse shaft part 12 of the pillar 1 than other parts located in the engagement groove part 42*a* of the ratchet 46. Therefore, the contact point separates from the axis (the rotation center of the headrest frame 2) of the transverse shaft part 12 of the pillar 1, and when the ratchet 46 moves from the engagement position to the disengagement position (when the locking is released), the release load due to the urging force of the headrest frame urging element 3 (the spring 33) from the rear can be reduced, which enables the adjustment of release load. In this embodiment, the engagement groove part 42*a* of the latch plate 42 located on the side engaging with an operation knob of the ratchet lever 44 is formed so as to have a narrow width, so that the transmission of a force from the ratchet lever 44 can be accomplished with certainty.

Also, the latch plates 41 and 42 are provided with the shaft insertion holes 41*d* and 42*d* for inserting the shaft 31, respectively.

Figure 11:
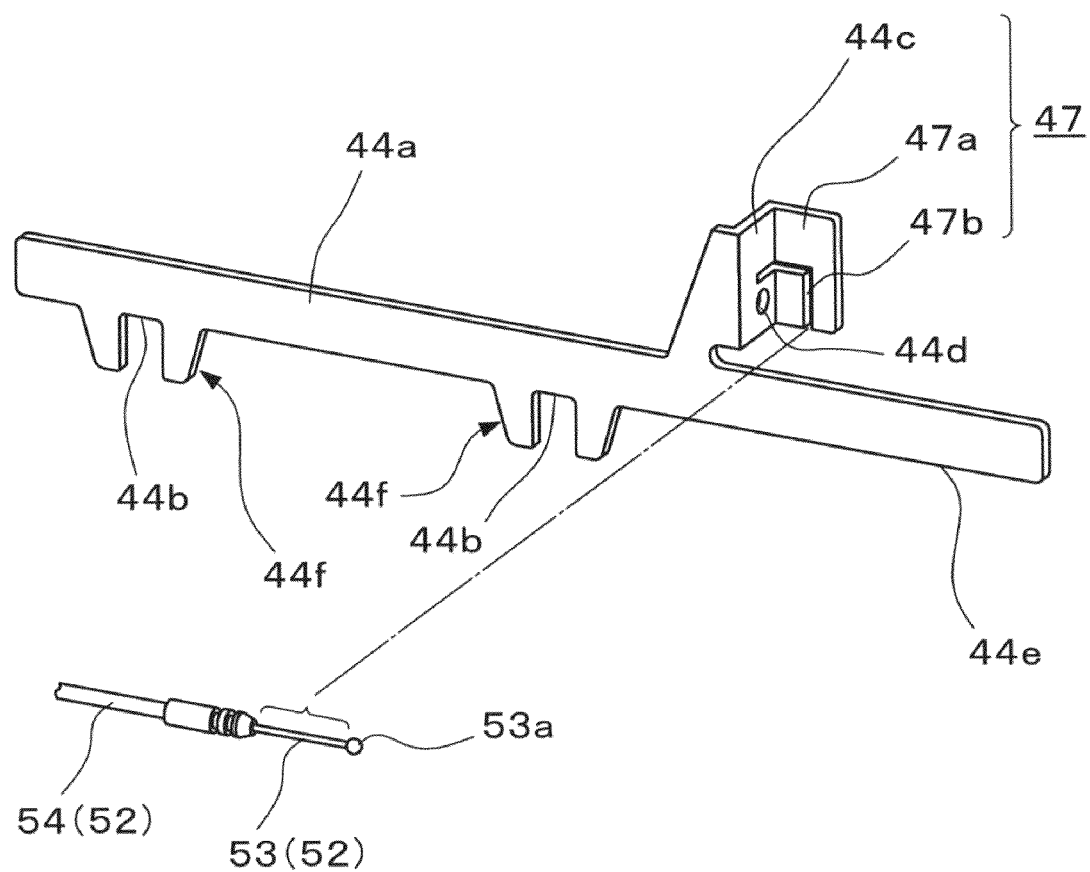
FIG. 11 is a perspective view of a ratchet lever in accordance with a first embodiment of the present invention.

As shown in FIG. 11, the ratchet lever 44 of this embodiment is formed by a slender plate body. A main plate body 44*a* slides in the transverse direction, and the main plate body 44*a* is formed with engagement concave parts 44*b* directed to the pillar 1 side. On the opposite side to the engagement concave parts 44*b* via the main plate body 44*a*, a movement locking part 44*c* comprising a plane raised substantially at right angles to the main plate body 44*a* is formed, and the movement locking part 44*c* is formed with a locking part 44*d* for locking the ratchet lever urging means 45. Further, a regulating piece 47*a* that is raised substantially at right angles to the movement locking part 44*c* and is substantially parallel with the main plate body 44*a* is formed. The regulating piece 47*a* and the movement locking part 44*c* are formed with a slit 47*b* continuously. The movement locking part 44*c*, the regulating piece 47*a*, and the slit 47*b* constitute a cable end locking part 47 that locks a cable end 53*a*. This ratchet lever 44 is manufactured as described below. One steel sheet is blanked to form the main plate body 44*a*, the engagement concave parts 44*b*, the locking part 44*d*, and the slit 47*b*. After blanking, the movement locking part 44*c* and the regulating piece 47*a* are formed.

The cable end is the end part of an inner cable 53 constituting the cable module, and the cable end 53*a* is an end part connected to the headrest HR side of the inner cable 53. In this specification, as a term generally naming the inner cable 53 and an outer cable 54, a cable 52 is used.

Each of the engagement concave parts 44*b* is formed between jutting-out parts 44*f* projecting from the main plate body 44a to the pillar 1 side, and is formed so as to hold one circular end side of the ratchet 46 and to allow the ratchet 46 to rotate.

To the locking part 44d of the ratchet lever 44, one end of the ratchet lever urging element (the spring 45) is connected so that the ratchets 46 are urged in the direction of the engagement groove parts 41a and 42a of the latch plates 41 and 42. Symbol 44e denotes the end part side on which the passenger directly operates the ratchet lever 44 to release the locking of the locking element or elements 4 and to tilt the headrest HR. The end part side 44e is engaged with the operation knob, not shown. The end part side 44e of the ratchet lever 44 is a control section used when the locking element or elements 4 is directly operated.

As described above, the cable end locking part 47 is a part formed on the ratchet lever 44 to lock the cable end 53a. The cable end locking part 47 is formed so that the slit 47b extends substantially in parallel with the lengthwise direction of the main plate body 44a continuously in the movement locking part 44c and the regulating piece 47a, and further extends downward in an L form substantially in the center of the regulating piece 47a, penetrating the lower side of the regulating piece 47a. Therefore, the inner cable 53 can be inserted into the slit 47b from the lower side of the regulating piece 47a. On the other hand, the cable end 53a is configured by providing a substantially spherical locking part having a diameter larger than the cable diameter of the inner cable 53 in the end part of the inner cable 53. The inner cable 53 is inserted through the slit 47b in an orientation in which the cable end 53a is positioned on the regulating piece 47a side of the movement locking part 44c, and the cable end 53a is locked to the cable end locking part 47, whereby the cable 52 is connected to the ratchet lever 44. Thus, the inner cable 53 is locked so as to be slidable in the slit 47b in an orientation in which the cable end 53a is positioned on the opposite side to the direction in which the inner cable 53 is pulled.

When the inner cable 53 is pulled, the cable end 53a comes into contact with the surface (contact part) on the regulating piece 47a side of the movement locking part 44c, and the ratchet lever 44 is pulled by the inner cable 53 and moves in the pulling direction. By the configuration described above, a pulling operation force from the remote control section R provided on the driver's seat side of the vehicle V can be transmitted to the ratchet lever 44 via the inner cable 53. The cable end locking part 47 has a construction such that the cable end 53a is locked to pull toward one direction (the direction in which the inner cable 53 is pulled) only. When the ratchet lever 44 is moved by manual operation, the cable end 53a fails to operate, so that the cable 52 does not hinder the operation of the ratchet lever 44. That is to say, the ratchet lever 44 is operable by two systems of remote control and manual direct control. The remote control section R is explained below.

As shown in FIGS. 4, 8 and 12, the ratchet 46 of this embodiment includes a rotation hole 46a serving as a rotation axis, an engagement part 46b, and the lock engagement point 46c, and is pivotally supported on the headrest frame 2 with the rivet 101 arranged between the main frame 21 and the sub frame 22 being used as a rotation shaft.

On the inside (the opposed side) of the main frame 21 and the sub frame 22, the substantially arc-shaped protruding parts 21f and the substantially arc-shaped protruding parts 22f are formed so as to project toward the rotating surface of the ratchet 46 to guide the rotating of the ratchets 46.

The engagement part 46b on one end side of the ratchet 46 engages with the engagement concave parts 44b of the ratchet lever 44, and the lock engagement point 46c on the other end side engages with the engagement groove part 41a, 42a of the latch plate 41, 42, whereby the raised state of the headrest HR is kept.

The engagement part 46b on one end side of the ratchet 46 engages with the engagement concave parts 44b of the ratchet lever 44, and the surface tangent to the engagement concave parts 44b is formed into a circular shape, preferably into a complete round shape. Thereby, the ratchet 46 can be rotated stably following the movement of the ratchet lever 44. The ratchet 46 has a thickness larger than that of the ratchet lever 44. Therefore, the ratchet 46 can be prevented from coming off the ratchet lever 44.

As shown in FIG. 12, the distance X1 between the center of the rotation hole 46a of the ratchet 46 and the center of the engagement part 46b on one end side of the ratchet 46 engaging with the engagement concave part 44b of the ratchet lever 44 is set so as to be longer than the distance Y1 between the center of the rotation hole 46a of the ratchet 46 and the position of the lock engagement point 46c (in FIG. 12, the locus 46d) on the other end side of the ratchet 46 crossingly engaging with the engagement groove part 42a of the latch plate 42. By this, the release load at the time when the locking of the ratchet 46 to the latch plate 41, 42 is released can be reduced.

That is to say, in this embodiment, in the raised state, the ratchet 46 pivotally supported on the headrest frame 2 is urged toward the tilt direction by the spring 33, so that friction occurs in a portion in which the ratchet 46 is in contact with the engagement groove part 42a of the latch plate 42. Therefore, when the ratchet 46 is rotated from the engagement position at which the ratchet 46 is positioned in the engagement groove part 42a of the latch plate 42 to the disengagement position at which the ratchet 46 deviates from the engagement groove part 42a, frictional resistance arises, so that a state in which the ratchet 46 is difficult to rotate is formed.

However, the ratchet 46 of this embodiment is formed so that the distance X1 between the center (support point) of the rotation hole 46a and the center (power point) of the engagement part 46b to which a load is applied by the ratchet lever 44 is longer than the distance Y1 between the center (support point) of the rotation hole 46a and the position (point of application) of the lock engagement point 46c crossingly engaging with the engagement groove part 42a of the latch plate 42. Therefore, the ratchet 46 can be moved from the engagement position to the disengagement position with a small force. That is to say, a so-called link ratio can be set, and thereby the release load can be adjusted.

Since the ratchet lever 44 is configured so as to hold one circular end side of the ratchet 46 and to allow the ratchet 46 to rotate, the engagement part 46b on one end side of the ratchet 46 is held in the engagement concave part 44b of the ratchet lever 44, and always engages with the ratchet lever 44, so that only one ratchet 46 can be prevented from rotating. That is to say, the ratchets 46 smoothly rotate always following the movement of the ratchet lever 44, malfunction is prevented, and a changeover due to the locking element or elements 4 can be accomplished with certainty.

The ratchet 46 of this embodiment can rotate in a rotation angle range of 20 to 40 degrees around the rotation hole (rotation axis) 46a.

If the ratchet 46 is configured so as to turn in a rotation angle range of 20 to 40 degrees around the rotation hole (rotation axis) 46a, disengagement of the ratchet 46 from the latch plate 41, 42 due to the rotation from the engagement position to the disengagement position and the transverse displacement of the ratchet lever 44 for the rotation of the ratchet 46 can be adjusted so as to be optimum. Thus, the displacement relating to the operation can be adjusted by the locking element or elements 4.

Figure 14:
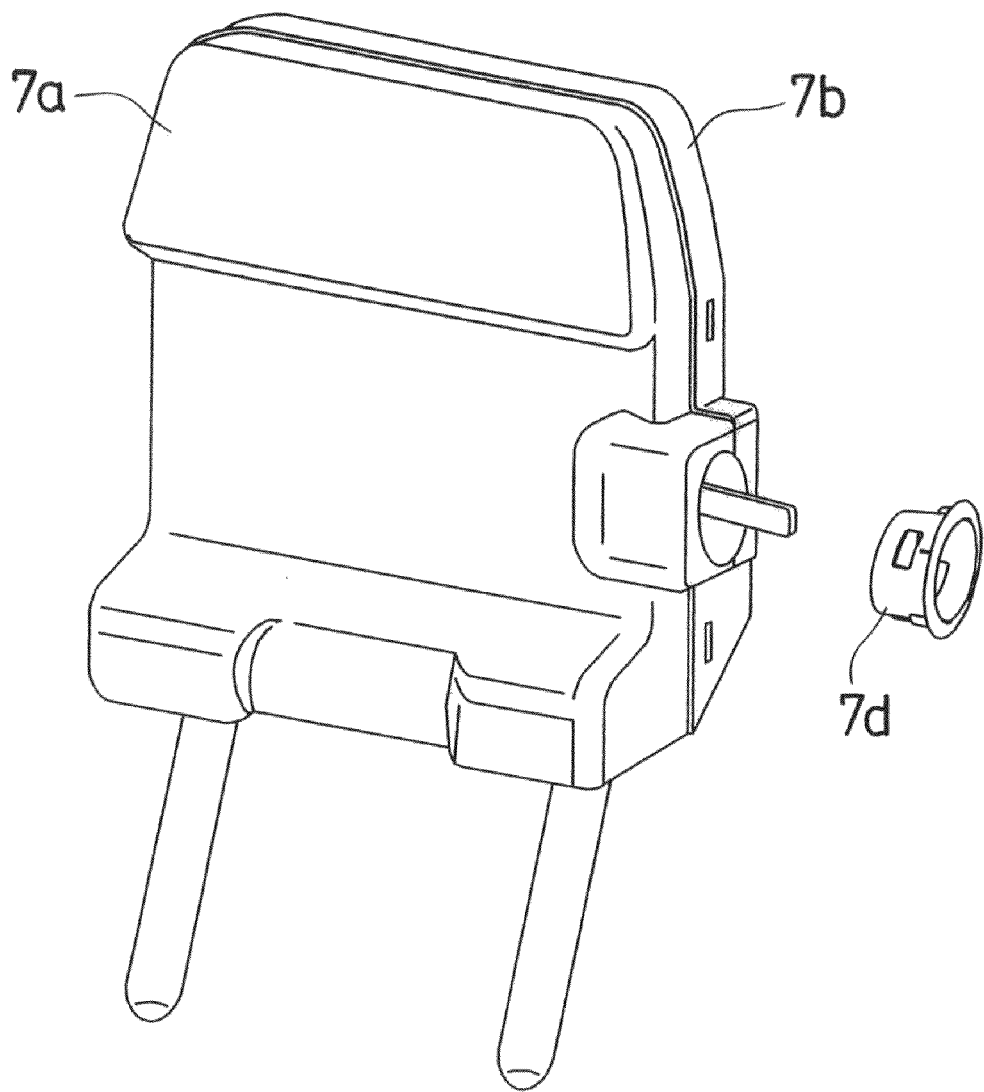
FIG. 14 is a partially exploded perspective view of a cover in accordance with a first embodiment of the present invention.
Figure 14:
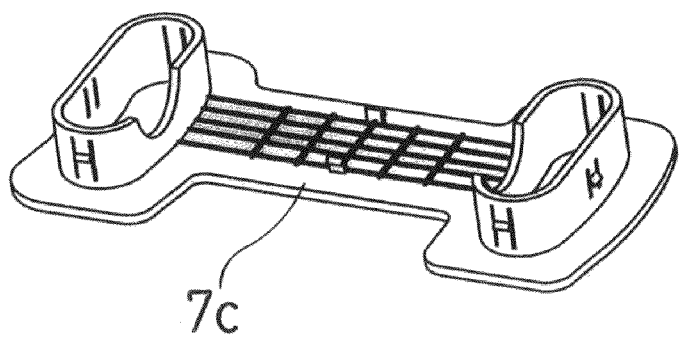

FIG. 14 shows an assembled state of a cover material 7. After the pillar 1 serving as the supporting member, the headrest frame 2 serving as the frame, the headrest frame urging element or elements 3 serving as the frame urging element or elements, the locking element or elements 4, and the like have been assembled, these elements are covered with the cover material 7. The cover material 7 includes the resin-made front cover member 7a, a rear cover member 7b, a seat cover fastening cover member 7c, and a garnish 7d for preventing the operation knob and the like of the control section from coming off.

Figure 3:
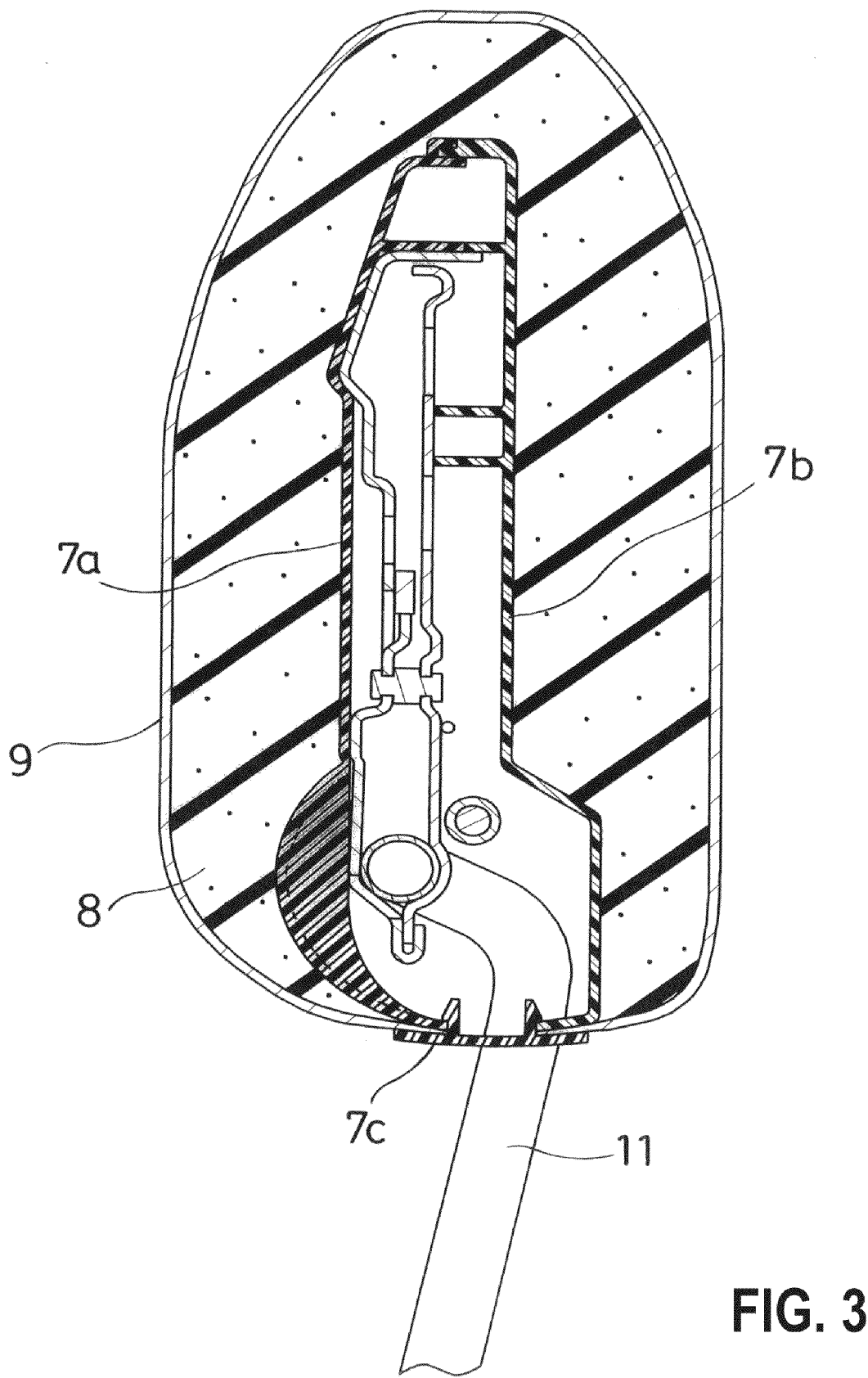
FIG. 3 is a sectional view taken along the line A-A of FIG. 2 in accordance with a first embodiment of the present invention.

As shown in FIG. 3, a pad material 8 is disposed at the outer periphery of the cover material 7, and a seat cover material 9 covers the pad material 8.

The seat cover material 9 of this embodiment is formed into a bag shape one end side of which is open. The front cover member 7a and the rear cover member 7b in which the headrest frame 2 and other various members are fitted are inserted through the opening part, and the seat cover terminal part on the opening side of the seat cover material 9 is covered by the seat cover fastening cover member 7c. An assembly of the seat cover material 9 and the cover material 7 is arranged in the cavity of a mold, and foaming is performed by injecting a foaming resin into a space between the seat cover material 9 and the cover material 7, whereby the pad material 8 is molded integrally with the seat cover material 9 and the cover material 7.

At a predetermined position of the sub frame 22, an outer casing fixing part 22s for mounting an outer casing of the cable module is formed. In this embodiment, as shown in FIG. 7, the outer casing fixing part 22s is formed near the center of the sub frame 22. The outer casing fixing part 22s of this embodiment is formed by bending and raising a part of the sub frame 22 to the outer side (the front side of paper of FIG. 7), and the outer casing is fixed so as to be held by the outer casing fixing part 22s. Since at least a part of the ratchet lever 44, that is, a part contributing to the operation and the like of the ratchet 46 of the locking element or elements 4 is positioned between the main frame 21 and the sub frame 22, the mounting of the outer casing does not exert an influence on the locking element or elements 4.

Figure 15:
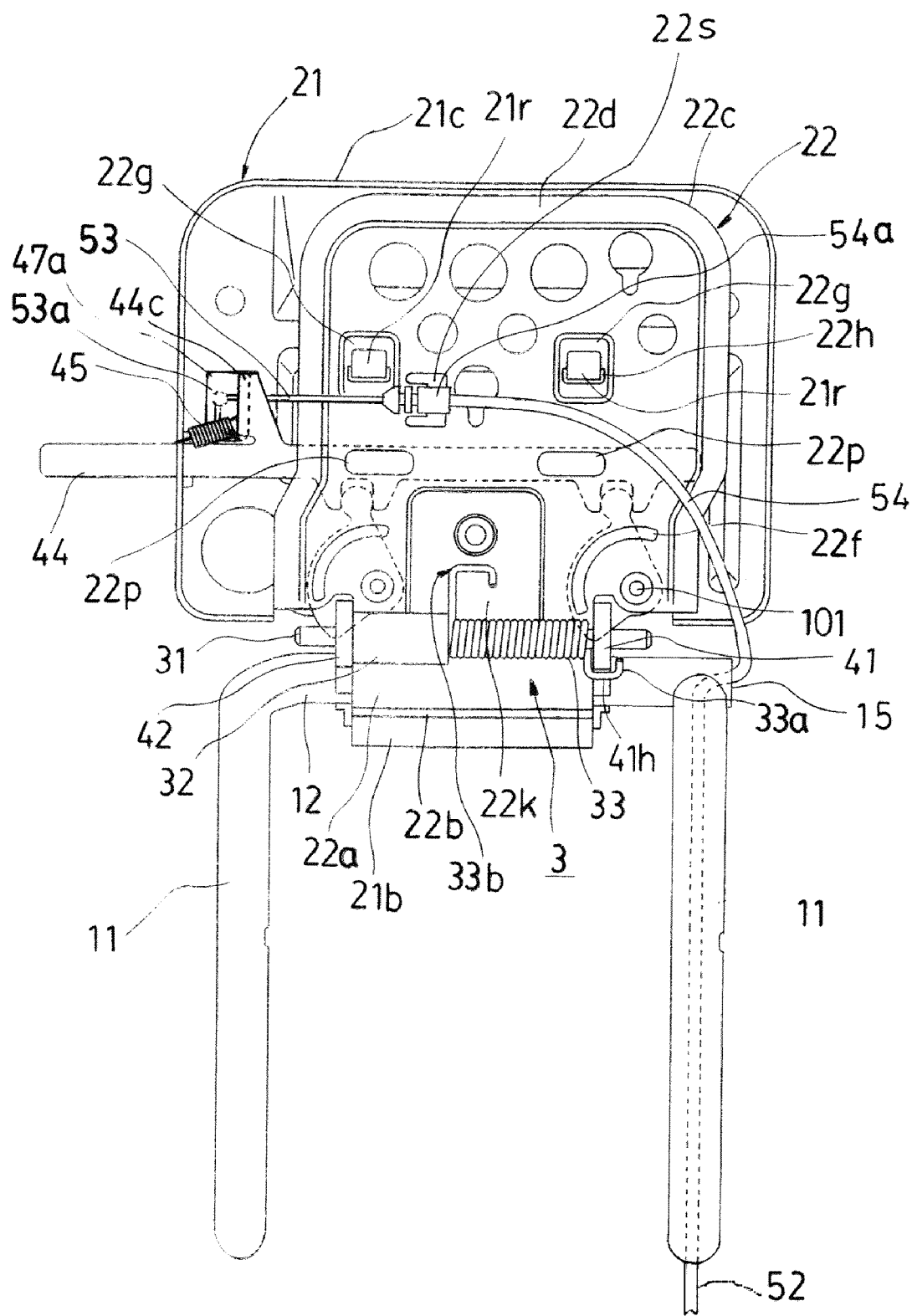
FIG. 15 is pictorial illustrative view in which a cable module is added to FIG. 7 in accordance with a first embodiment of the present invention.

FIG. 15 is an explanatory view showing a state in which the cable module is assembled to the structure shown in FIG. 7. The cable module of this embodiment includes the inner cable 53 for transmitting an operating force from the remote control section R, the outer cable 54 for covering the outside of the inner cable 53, and an outer casing 54a provided in the end part of the outer cable 54. Also, in the end part of the inner cable 53, the aforementioned cable end 53a is provided. In this specification, a combination of the inner cable 53 and the outer cable 54 is called the cable 52.

The outer casing 54a is fixed to the outer casing fixing part 22s provided on the sub frame 22, and on the other hand, the cable end 53a is locked to the cable end locking part 47 provided on the ratchet lever 44, whereby the operating force from the remote control section R provided on the driver's seat side is transmitted to the ratchet lever 44. Thus, the ratchet lever 44 serving as the operation lever can move against the ratchet lever urging element 45. The remote control section R will be described below.

Thus, by utilizing the movement locking part 44c of the ratchet lever 44, the end part of the ratchet lever urging means 45 is locked, and at the same time, the ratchet lever 44 is connected to the cable end 53a. Therefore, the ratchet lever 44 can be operated via the inner cable 53 connected to the remote control section R without the use of a link having any other configuration.

The cable end 53a connected to the inner cable 53 of the cable module extends in the same direction as that of the ratchet lever 44 serving as the operation lever. The cable end 53a is connected to the cable end locking part 47 formed on the ratchet lever 44 as described above, and can advance and retreat in the same direction as the movable direction of the ratchet lever 44. Therefore, the slide resistance of the ratchet lever 44 can be kept to a minimum, thereby reducing malfunction and securing stable operation.

At least one side of the leg parts 11 of the pillar 1 serving as the supporting member and the transverse shaft part 12 are formed by a hollow cylindrical body (a pipe material). As shown in FIG. 15, in the case where an opening 15 is formed in the end part on the reverse side of the end part on the movement locking part 44c side of the transverse shaft part 12, the cable 52 for connecting the cable end locking part 47 to the remote control section R can be laid by being inserted through the opening 15. That is to say, the pillar 1 is formed by the transverse shaft part 12 comprising a hollow cylindrical body provided with the inverse L-shaped opening 15, the leg part 11 on one side extending downward so as to be continuous with the reverse side to the opening 15 of the transverse shaft part 12, and the leg part 11 on the other side that extends downward so as to be connected to the opening 15 side of the transverse shaft part 12 and is disposed substantially in parallel with the leg part 11 on one side. Since the opening 15 is formed on the reverse side to the operation side of the ratchet lever 44 (the movement locking part 44c side), the cable 52 in the headrest frame 2 can be made short, so that the cable 52 can be laid easily, and also the bend can be reduced, so that the increase in slide resistance of the inner cable 53 can be restrained.

As shown in FIG. 15, the cable 52 extends from the opening 15, passing through the upper part of the arrangement position of the ratchet lever 44 on the outer surface side of the sub frame 22 (on the opposite side to the main frame 21), and is laid to the cable end locking part 47 via the outer casing fixing part 22s. That is to say, the cable 52 extending from the opening 15 is laid so as to avoid the arrangement region and the movable region of the ratchet lever 44, the ratchets 46, the latch plates 41 and 42, and the like constituting the locking element or elements 4. Therefore, the cable 52 does not hinder the operation of the locking element or elements 4. As described above, the cable 52 is configured so as to pass through the interior of the pillar 1 and to be laid so as to avoid the arrangement region of the movable members of the headrest frame, and connects the ratchet lever 44 to the remote control section R provided on the driver's seat side.

The remote control section R is explained below.

The remote control section R is provided at the lower side of the dashboard D as described above, and is operable by a passenger seated on the driver's seat using one hand.

Figure 16:
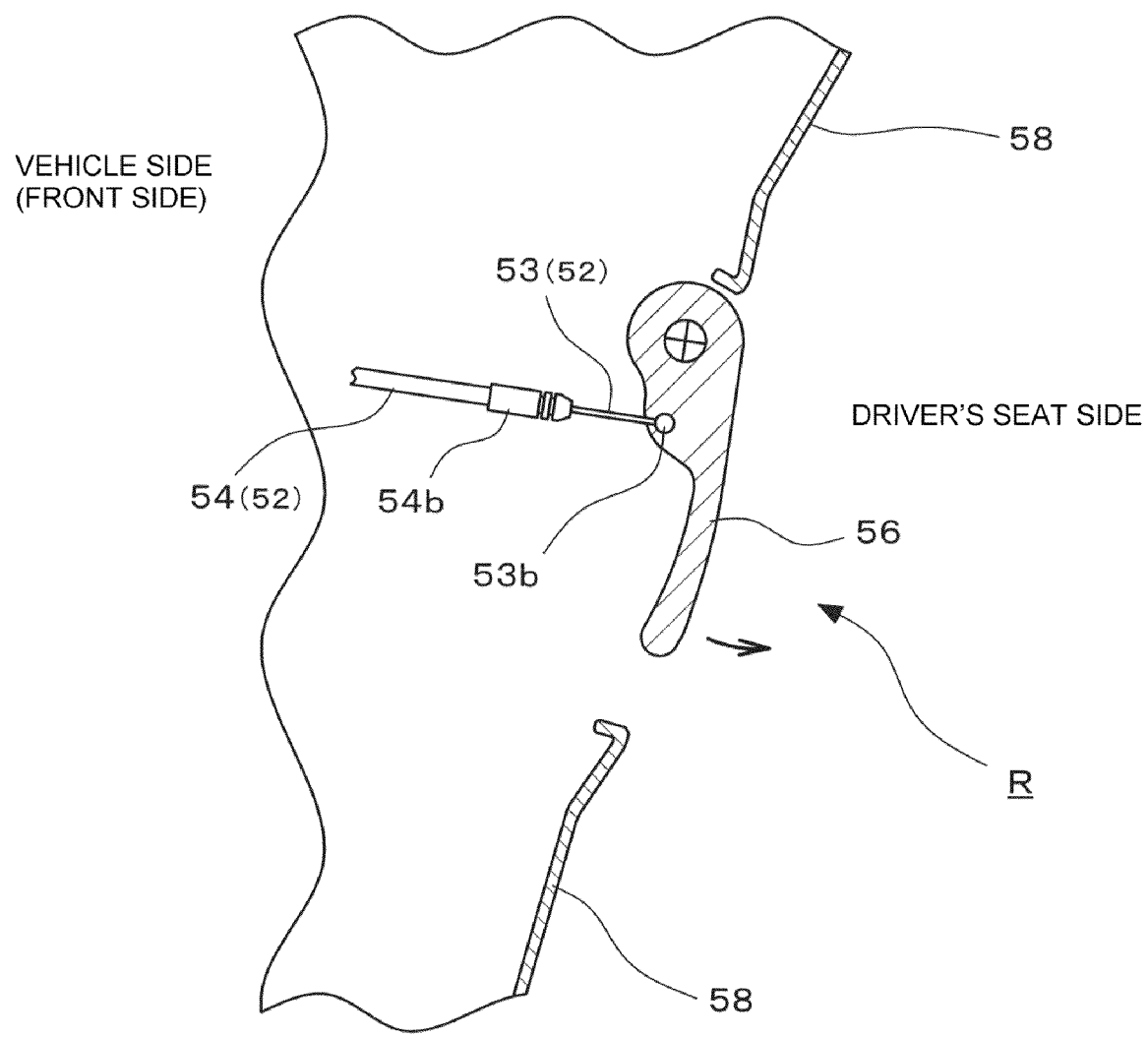
FIG. 16 is a sectional illustrative view of a remote control section in accordance with a first embodiment of the present invention.

As shown in FIG. 16, the remote control section R has a lever 56 to which a cable end 53b in the end part of the cable module on the reverse side to the headrest HR is connected. The lever 56 is disposed so that one end part side is pivotally supported on the vehicle side and the other end side can be pulled by the passenger, and the cable end 53b is locked to a substantially central part of the lever 56. Also, an outer casing 54b in the end part of the cable module on the reverse side to the headrest HR is fixed to the vehicle side near the lever 56. Symbol 58 denotes an instrument panel of the dashboard D.

Thus, the passenger can pull the inner cable 53 by operating the other end part side of the lever 56. Since the other end part side of the inner cable 53 is locked to the cable end locking part 47 of the ratchet lever 44 as described above, the ratchet lever 44 can be operated by the operation of the lever 56.

That is to say, the passenger seated on the driver's seat can tilt the headrest HR of the rear seat to the front by operating the lever 56 in a seated posture to secure the rear visibility. In the case where the configuration in accordance with the present invention is applied to the front seat (front passenger seat), the front visibility from the rear seat side can be secured.

Next, the operation of the headrest HR configured as described above is explained.

Since the headrest frame 2 is rotatably mounted to the transverse shaft part 12 of the pillar 1, and is fixed by the locking element or elements 4, the headrest HR at the normal time can protect the head of a seated person when a shock is applied in an raised state.

That is to say, the pillar 1 mounted on the upper part of the seat back S2 has the transverse shaft part 12, and the transverse shaft part 12 of the pillar 1 and the headrest frame 2 are rotatably engaged with each other. At the normal time, the headrest frame 2 is urged so as to be tilted by the headrest frame urging element or elements 3. In the raised state, the tilt is locked by the locking element or elements 4 provided between the headrest frame 2 and the pillar 1. This raised state is shown in FIGS. 5 to 8. Therefore, the headrest HR is in the raised state as shown in FIG. 3.

In the locking element or elements 4, when the engagement part 46*b* on one end side of the ratchet 46 is pushed by the sliding motion of the ratchet lever 44, the ratchet 46 rotates around the rotation axis, and the lock engagement point 46*c* on the other end side of the ratchet 46 moves in the direction crossing the engagement groove part 41*a*, 42*a* of the latch plate 41, 42.

In the raised state, the ratchet 46 is located in the engagement groove part 41*a*, 42*a* and is in contact with the latch plate 41, 42. Therefore, the pillar 1 and the headrest frame 2 are in a locked state, and the raised state of the headrest HR is held.

By operating the ratchet lever 44 against the ratchet lever urging element 45, the engagement part 46*b* on one end side of the ratchet 46 is pushed, and the ratchet 46 rotates around the rotation axis. Therefore, the ratchet 46 retracts from the engagement groove part 41*a*, 42*a*, and the ratchet 46 comes off the engagement groove part 41*a*, 42*a* of the latch plate 41, 42. At this time, at the normal time, the spring 33, which is the headrest frame urging element or elements 3, urges the headrest frame 2 toward the tilt direction, so that the headrest HR tilts around the transverse shaft part 12, becoming in a storage state.

As described above, in the head support state in which the headrest HR is raised with respect to the seat back S2 and in the storage state tilted from the head support state, in the present invention, the ratchet lever 44, the latch plates 41 and 42, and the ratchets 46 are used as the locking element or elements 4, and the changeover between the engagement position and the disengagement position is accomplished via the ratchet 46 one end side of which engages with the engagement concave part 44*b* of the ratchet lever 44 and the other end side of which can crossingly engage with the engagement groove part 41*a*, 42*a* of the latch plate 41, 42. Therefore, the locking element or elements 4 itself can be configured so as to be compact without requiring a great width. Moreover, since at least one of the engagement groove parts 41*a* and 42*a* of the latch plates 41 and 42 serving as the locking members is formed so that the upper end side thereof is narrower, the contact point between the latch plate 42 and the ratchet 46 separates from the transverse shaft part 12 of the pillar 1. Therefore, the release load due to the urging force of the headrest frame urging element 3 (the spring 33) from the rear at the time when the locking is released can be reduced.

At the normal time, by the ratchet lever urging element 45, the ratchet lever 44 is urged in the direction in which the ratchet 46 is engaged with the engagement groove part 41*a*, 42*a* of the latch plate 41, 42. By the operation of the ratchet lever 44 against the ratchet lever urging element 45, the ratchet 46 is disconnected from the engagement groove part 41*a*, 42*a*, and by the headrest frame urging element or elements 3, the headrest frame 2 is tilted to the storage state, so that the headrest HR tilts. This operation of the ratchet lever 44 can be performed by pushing in the ratchet lever 44 toward the headrest frame 2 by the passenger directly by hand via the operation knob, not shown. Further, the ratchet lever 44 can also be operated against the ratchet lever urging element 45 by the operation of the remote control section R. In both of the operating methods, the locking of the locking element or elements 4 can be released by one operation (one action), whereby the headrest HR can be tilted so as to become in the storage state.

Furthermore, by making one end side of the ratchet 46, which is in contact with the engagement concave part 44*b* of the ratchet lever 44, circular, the ratchet 46 is turned smoothly in the engagement concave part 44*b* of the ratchet lever 44 with the movement of the ratchet lever 44. Therefore, the ratchet 46 can be engaged with and disengaged from the engagement groove part 41*a*, 42*a* of the latch plate 41, 42, so that an exact locking releasing operation can be performed.

In the case where the headrest HR in the storage state is made in the raised state, since at the normal time, the ratchet lever 44 is urged by the ratchet lever urging means (spring) 45, and the ratchet 46 is urged in the direction in which the ratchet 46 engages with the engagement groove part 41*a*, 42*a* of the latch plate 41, 42, when the headrest HR is raised by hand, the ratchet 46 rotates and the lock engagement point 46*c* engages with the engagement groove part 41*a*, 42*a* of the latch plate 41, 42, whereby a locked state is established.

In the above-described embodiment, two latch plates 41 and 42 serving as the locking members of the locking element or elements 4 and two ratchets 46 serving as the fixing member are provided. However, the number of these elements may be one or three or more. It is a matter of course that according to the number, one or a plurality of engagement concave parts 44*b* of the ratchet lever 44 serving as the operation lever can be formed.

In this embodiment, the remote control section R is provided at the driver's seat side. However, the position at which the remote control section R is provided is optional. The remote control section R can be provided at any position, for example, in a cargo room, on the vehicle body floor FL side or the roof lining side near the front seat or the rear seat, or the like.

Also, the above-described end part side of the cable 52 on the reverse side to the headrest HR (the end part of the cable 52 on the remote control side) is attached to the remote control section R configured so that the inner cable 53 is pulled by the operation of the lever 56. However, the attachment structure of the end part of the cable 52 on the remote control side is not limited to this structure. There may be used a method in which a foot pedal is used as the lever 56, or a publicly known structure in which, for example, the cable end 53*b* is attached to a strap (a belt-like or string-like pulling member) attached to the back part of the sear back or the side part of the seat cushion.

Furthermore, in this embodiment, the configuration is made such that the lever 56 is operated by the passenger's hand. However, the configuration is not limited to this one. The configuration may be such that the cable end 53b, which is the end part on the remote control side of the inner cable 53, can be pulled. Alternatively, the configuration may be such that a member to which the cable end 53b is attached is operated by the turn-on of power switch, and the cable end 53b of the inner cable 53 is pulled electrically.

Second Embodiment

Figure 17:
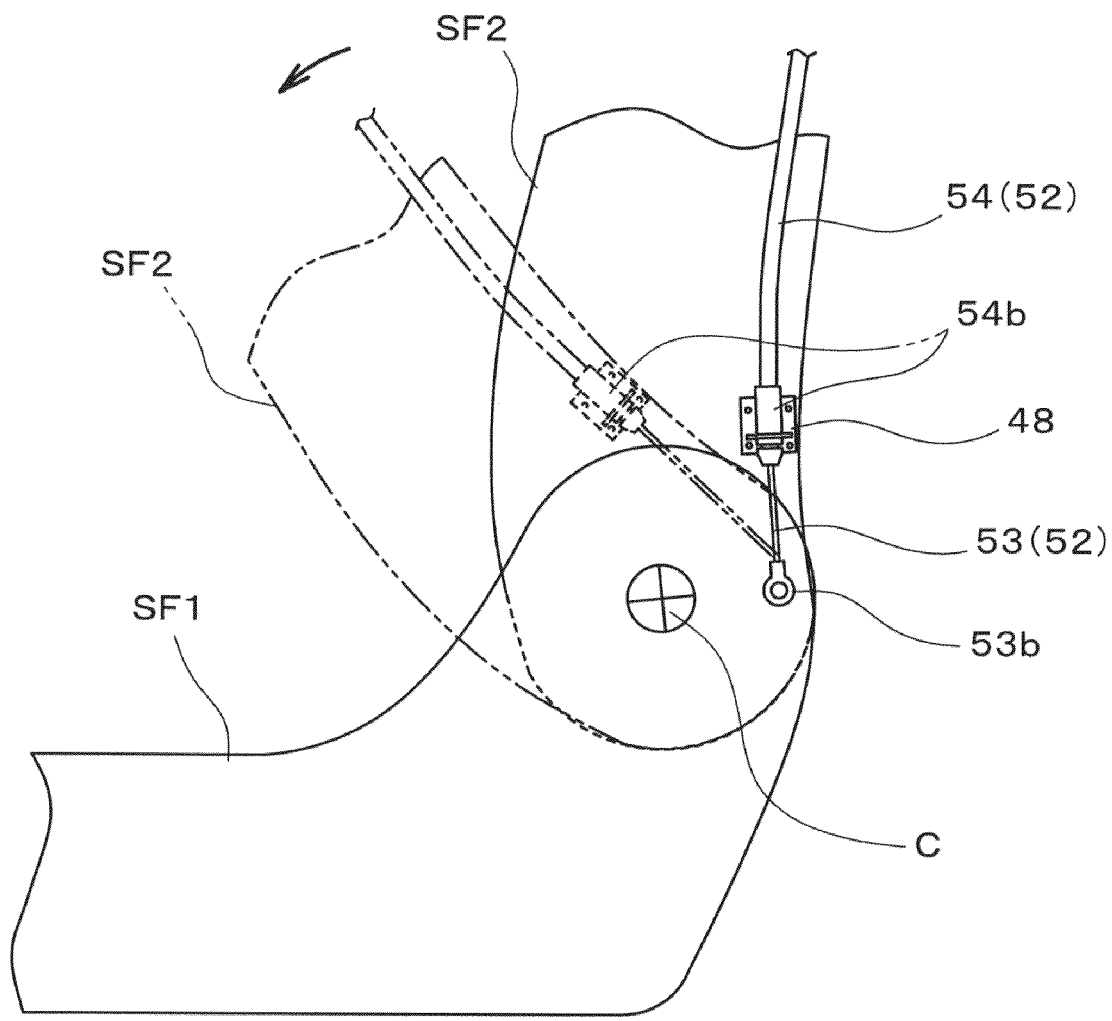
FIG. 17 is a pictorial illustrative view of an attachment structure of the end part of a cable on the remote control side in accordance with a second embodiment of the present invention.
Figure 18:
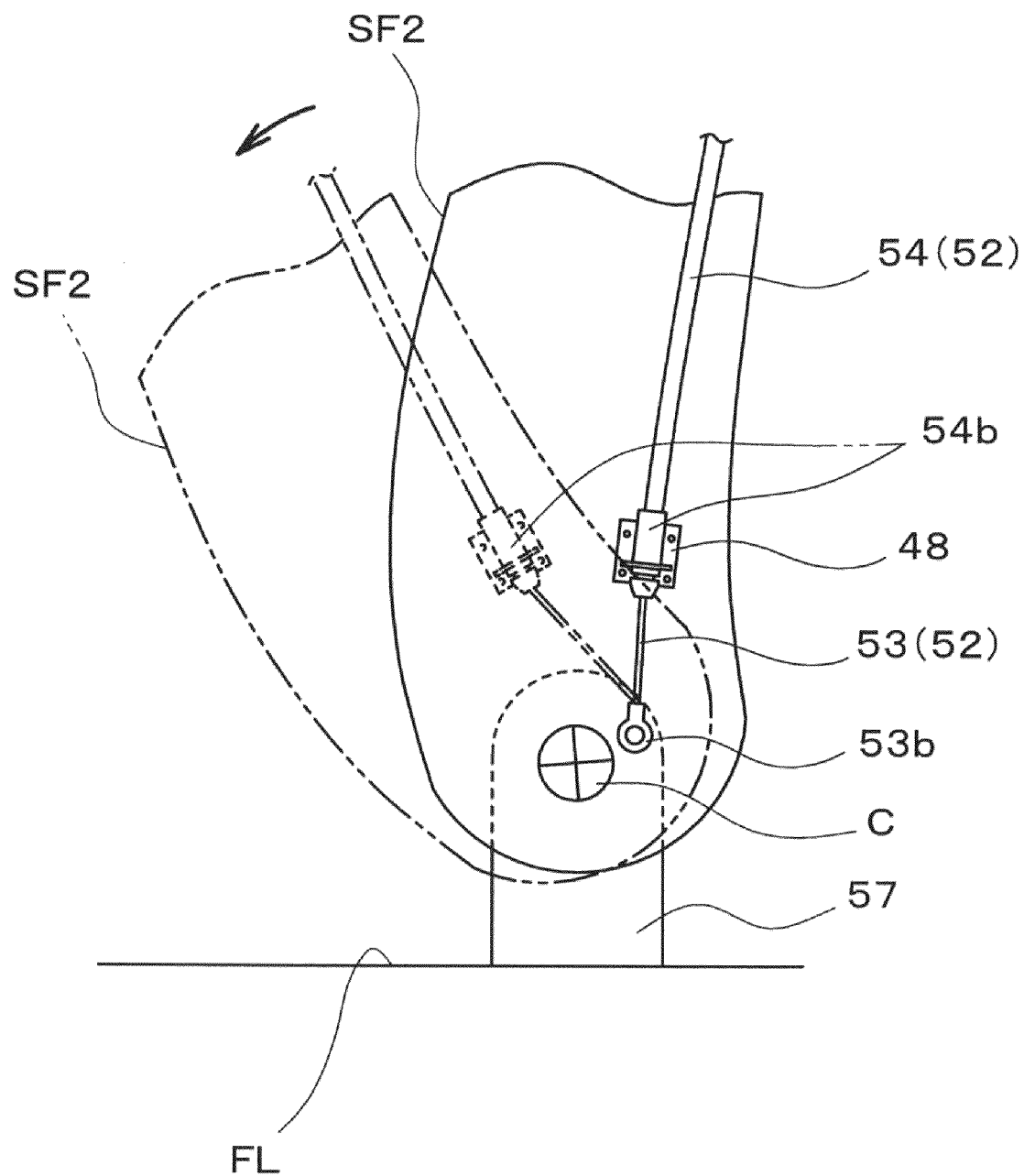
FIG. 18 is a pictorial illustrative view of an attachment structure of the end part of a cable on the remote control side in accordance with a modification of a second embodiment of the present invention.
Figure 19:
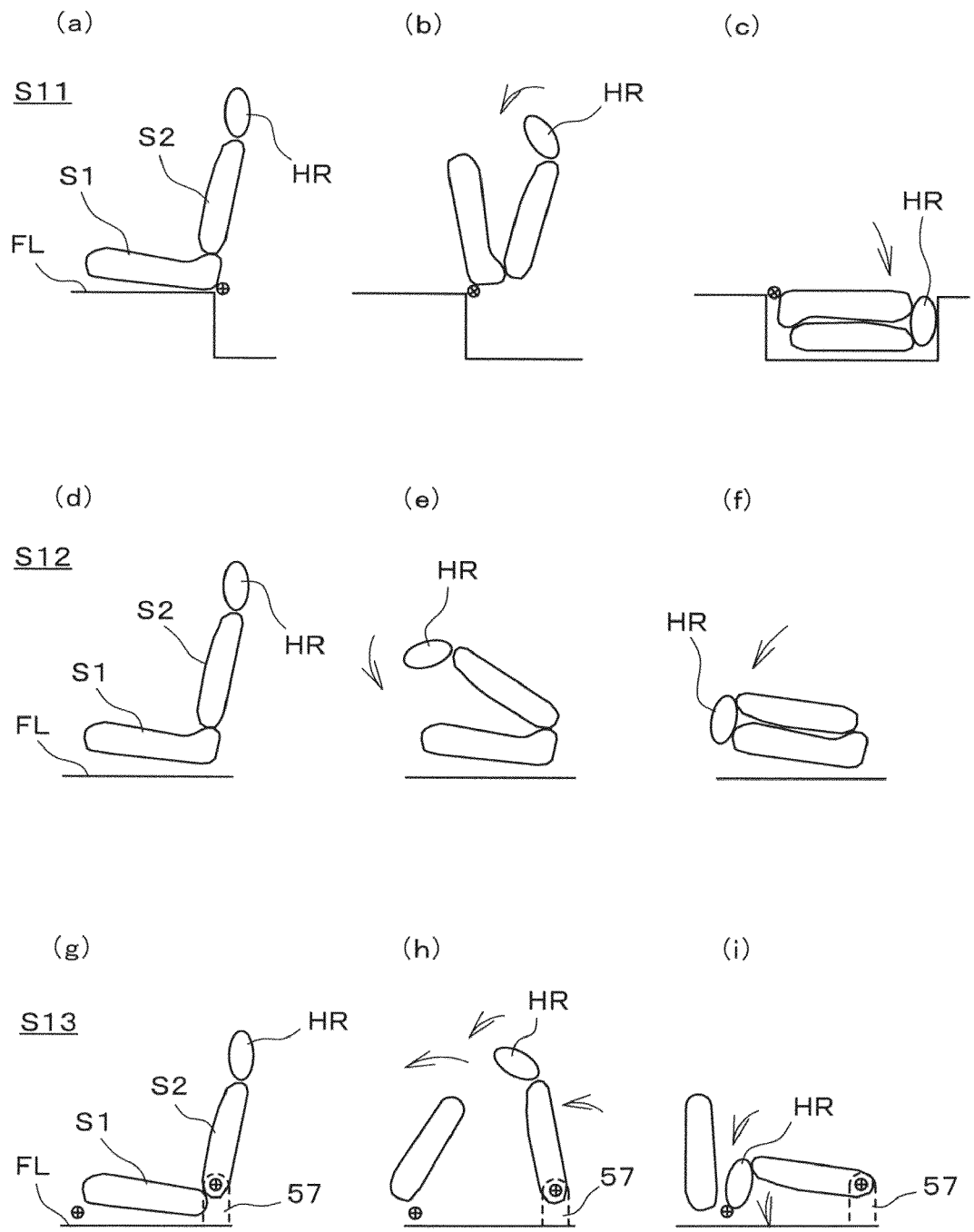
FIG. 19 is a pictorial illustrative view showing the operation of a vehicle seat in accordance with a second embodiment of the present invention.

FIGS. 17 to 19 show a second embodiment of the present invention. FIGS. 17 and 18 are explanatory views of attachment structures of the end part of the cable 52 on the remote control side, and FIG. 19 is an explanatory view showing the operation of the vehicle seat in accordance with this embodiment.

This embodiment is a modification of the attachment structure of the end part of the cable 52 on the remote control side in the first embodiment. The configuration is such that the end part of the cable 52 on the remote control side is attached to the lower part of the seat back S2. Other configurations are the same as those in the first embodiment, and therefore the duplicated explanation is omitted.

Specifically, as shown in FIG. 17, a seat back frame SF2 constituting the seat back S2 is attached to a seat cushion frame SF1 constituting the seat cushion 51 so as to be rotatable around a rotation center C. The outer casing 54b on the remote control side is fixed to the seat back frame SF2 by an outer casing fixing part 48, and the cable end 53b on the remote control side is attached to the rear end part side of the seat cushion frame SF1 via a jig, not shown.

Also, the cable end 53b is attached to a position separate from the rotation center C of the seat back frame SF2 and the seat cushion frame SF1 to the rear. Therefore, when the seat back S2 is folded to the front with respect to the seat cushion S1, as indicated by an imaginary line in FIG. 17, the seat back frame SF2 of the seat back S2 rotates around the rotation center C with respect to the seat cushion frame SF1 of the seat cushion S1. Accordingly, the distance between the cable end 53b and the outer casing 54b increases, whereby the inner cable 53 is pulled. By the pulling of the inner cable 53, the locking of the locking element or elements 4 provided on the headrest HR is released, and the headrest HR is tilted, becoming in the storage state. That is to say, the headrest HR can be folded in association with the folding of the seat back S2.

FIG. 18 shows a modification of the attachment structure of the end part of the cable 52 on the remote control side shown in FIG. 17. The vehicle seat S of this modification is a double fall-down seat in which the seat back S2 is tilted to the front after the seat cushion S1 has been jumped up to the front. The seat back frame SF2 constituting the seat back S2 is attached to a bracket 57 disposed on the vehicle body floor FL so as to be rotatable around the rotation center C. The outer casing 54b on the remote control side is fixed to the seat back frame SF2 by the outer casing fixing part 48, and the cable end 53b on the remote control side is attached to the bracket 57 via a jig, not shown.

Also, the cable end 53b is attached to a position separate from the rotation center C of the seat back frame SF2 and the bracket 57 to the rear. Therefore, when the seat back S2 is folded to the front, as indicated by an imaginary line in FIG. 18, the seat back frame SF2 of the seat back S2 rotates to the front around the rotation center C with respect to the bracket 57. Accordingly, the distance between the cable end 53b and the outer casing 54b increases, whereby the inner cable 53 is pulled. By the pulling of the inner cable 53, the locking of the locking element or elements 4 provided on the headrest HR is released, and the headrest HR is tilted, becoming in the storage state. That is to say, in this modification as well, the headrest HR can be folded in association with the folding of the seat back S2.

The cable end 53b may be attached to the seat cushion frame SF1 via a tension spring. By the use of the tension spring, the tension of the inner cable 53 can be kept at a value not higher than the fixed value.

The vehicle seat of this embodiment may have a configuration such that the seat back S2 is folded by the passenger by hand, or may have a configuration such that the seat back S2 is tilted and folded electrically.

FIG. 19 is an explanatory view showing the operation of the vehicle seat in accordance with this embodiment. In all of the cases shown in FIG. 19, the convenience in use is improved.

FIGS. 19(a) to 19(c) show an example in which the configuration in accordance with this embodiment is applied to a rotary storage type vehicle seat S11. In this example, when the vehicle seat S11 is stored in a storage concave part, the folding of the headrest HR is performed automatically in association with the folding of the seat back S2, whereby the number of operations at the time when the vehicle seat S11 is stored can be reduced.

FIGS. 19(d) to 19(f) show an example in which the configuration in accordance with this embodiment is applied to a vehicle seat S12 that can be stored as a fall-down type. In this example, the folding of the headrest HR is performed automatically in association with the folding of the seat back S2, whereby the number of operations at the time when the vehicle seat S12 is stored can be reduced. Also, when the seat back S2 is folded, the headrest HR can be prevented from coming into contact with the front seat.

FIGS. 19(g) to 19(i) show an example in which the configuration of the modification of this embodiment is applied to a vehicle seat S13 that can be stored as a double fall-down type. In this example, the folding of the headrest HR is performed automatically in association with the folding of the seat back S2, whereby the number of operations at the time when the vehicle seat S13 is stored can be reduced. Also, during the time when the vehicle seat S13 is being stored, the headrest HR can be prevented from coming into contact with the rear end part side of the jumped-up seat cushion S1.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware components configured to perform the specified functions. The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A headrest that tilts from a head support state in which the headrest is raised with respect to a seat back to a storage state, comprising:
   a supporting member mounted on the upper part of the seat back;
   a headrest frame formed by combining a main frame and a sub frame, which are rotatably engaged with the supporting member;
   a frame urging element or elements that urge the headrest frame to one side;
   a locking element or elements that hinder a rotation of the headrest frame with respect to the supporting member;
   a remote control provided at a position separate from the headrest; and
   an inner cable one end part of which is connected to the locking element or elements and the other end part of which is attached to the remote control; and
   a control section operable directly by a passenger, which is different from the remote control, and the locking element or elements are releasable by the direct operation of the control section,
wherein:
   the remote control pulls the other end part of the inner cable;
   the locking element or elements include an operation lever that the one end part of the inner cable is connected thereto and that is movable by the pulling operation of the inner cable;
   the locking element or elements release by the pulling operation of the inner cable due to the operation of the remote control, and the control section and the operation lever comprise a common element; and
   the inner cable one end part directly connects to the operation lever with no intervening movable linkage.

2. The headrest according to claim 1, wherein the operation lever has a locking part that locks the one end part of the inner cable, and the one end part of the inner cable is locked to the locking part so that the operation lever is pulled in one direction only.

3. A headrest system, comprising:
   the headrest according to claim 1, wherein the remote control is disposed at a lower side of a vehicle dashboard on a driver's seat side.

4. A vehicle seat provided with a headrest that tilts from a head support state in which the headrest is raised with respect to a seat back to a storage state, wherein:
   the headrest comprises:
      a supporting member mounted on the upper part of the seat back;
      a headrest frame formed by combining a main frame and a sub frame, which are rotatably engaged with the supporting member;
      a frame urging element or elements that urge the headrest frame to one side;
      a locking element or elements that hinder a rotation of the headrest frame with respect to the supporting member;
      a remote control provided at a position separate from the headrest; and
      an inner cable one end part of which is connected to the locking element or elements and the other end part of which is attached to the remote control; and
      a control section operable directly by a passenger, which is different from the remote control, and the locking element or elements are releasable by the direct operation of the control section,
   wherein:
      the remote control pulls the other end part of the inner cable;
      the locking element or elements include an operation lever that the one end part of the inner cable is connected thereto and that is movable by the pulling operation of the inner cable;
      the locking element or elements release by the pulling operation of the inner cable due to the operation of the remote control, and the control section and the operation lever comprise a common element; and
      the inner cable one end part directly connects to the operation lever with no intervening movable linkage.

5. A vehicle seat provided with a headrest, comprising:
   a seat back rotatable with respect to a seat cushion; and
   the headrest that tilts from a head support state in which the headrest is raised with respect to the seat back to a storage state, wherein:
   the headrest comprises:
      a supporting member mounted on the upper part of the seat back;
      a headrest frame formed by combining a main frame and a sub frame, which are rotatably engaged with the supporting member;
      a frame urging element or elements that urge the headrest frame to one side;
      a locking element or elements that hinder a rotation of the headrest frame with respect to the supporting member;
      an inner cable one end part of which is connected to the locking element or elements and the other end part of which is attached to the seat cushion;
      an outer cable for guiding the inner cable, one end part of which is fixed to the headrest frame and the other end part of which is fixed to the seat back; and a control section operable by direct operation of a passenger, which is different from the folding operation of the seat back, and the locking element or elements are releasable by the direct operation of the control section, wherein:
the other end part of the inner cable is attached to a position separate in the direction opposite to the tilt direction at the time when the seat back is folded from the rotation center of the seat back with respect to the seat cushion, and is pulled in association with the folding operation of the seat back, thereby operating as a remote control;
the locking element or elements include an operation lever that the one end part of the inner cable is connected thereto and that is movable by the pulling operation of the inner cable;
the locking element or elements release by the pulling operation of the inner cable due to the operation of the remote control, and the control section and the operation lever comprise a common element; and
the inner cable one end part directly connects to the operation lever with no intervening movable linkage.

6. The vehicle seat provided with a headrest according to claim 5, wherein the vehicle seat is storable as:
a rotary storage type, comprising a pivot fixed to the vehicle about which both the seat back and the seat cushion rotate between a stored and an operable condition; or
a fall-down type, comprising a pivot about which the seat back rotates relative to the seat cushion between a stored and an operable condition, wherein the seat cushion is fixed to the vehicle.

7. A vehicle seat provided with a headrest, comprising:
a seat back rotatable with respect to a bracket provided on the vehicle side; and
the headrest that tilts from a head support state in which the headrest is raised with respect to the seat back to a storage state, wherein:
the headrest comprises:
a supporting member mounted on the upper part of the seat back;
a headrest frame formed by combining a main frame and a sub frame, which are rotatably engaged with the supporting member;
a frame urging element or elements that urge the headrest frame to one side;
a locking element or elements that hinder a rotation of the headrest frame with respect to the supporting member;
an inner cable one end part of which is connected to the locking element or elements and the other end part of which is attached to the bracket;
an outer cable for guiding the inner cable, one end part of which is fixed to the headrest frame and the other end part of which is fixed to the seat back; and
a control section operable by direct operation of a passenger, which is different from the folding operation of the seat back, and the locking element or elements are releasable by the direct operation of the control section, wherein:
the other end part of the inner cable is attached to a position separate in the direction opposite to the tilt direction at the time when the seat back is folded from the rotation center of the seat back with respect to the seat cushion, and is pulled in association with the folding operation of the seat back, thereby operating as a remote control;
the locking element or elements include an operation lever that the one end part of the inner cable is connected thereto and that is movable by the pulling operation of the inner cable;
the locking element or elements release by the pulling operation of the inner cable due to the operation of the remote control, and the control section and the operation lever comprise a common element; and
the inner cable one end part directly connects to the operation lever with no intervening movable linkage.

8. The vehicle seat provided with a headrest according to claim 7, wherein the vehicle seat is storable as a double fall-down type, comprising a first pivot about which the seat cushion rotates away from the seat back, and a second pivot about which the seat back rotates towards the seat cushion in going from an operable to a stored position.

* * * * *